US008909753B2

(12) United States Patent
Nakamura et al.

(10) Patent No.: US 8,909,753 B2
(45) Date of Patent: Dec. 9, 2014

(54) ROOT NODE FOR FILE LEVEL VIRTUALIZATION

(71) Applicants: Takaki Nakamura, Ebina (JP); Koji Sonoda, Sagamihara (JP); Jun Nemoto, Yokohama (JP)

(72) Inventors: Takaki Nakamura, Ebina (JP); Koji Sonoda, Sagamihara (JP); Jun Nemoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 13/752,530

(22) Filed: Jan. 29, 2013

(65) Prior Publication Data

US 2013/0144921 A1 Jun. 6, 2013

Related U.S. Application Data

(63) Continuation of application No. 11/972,653, filed on Jan. 11, 2008, now Pat. No. 8,380,815.

(30) Foreign Application Priority Data

Mar. 23, 2007 (JP) ................. 2007-076867

(51) Int. Cl.
G06F 15/173 (2006.01)
G06F 15/16 (2006.01)
G06F 12/00 (2006.01)
G06F 17/30 (2006.01)

(52) U.S. Cl.
CPC .... *G06F 17/30194* (2013.01); *G06F 17/30233* (2013.01)
USPC ............ 709/223; 707/827; 709/217; 709/219

(58) Field of Classification Search
None
See application file for complete search history.

(56) References Cited

U.S. PATENT DOCUMENTS

| 5,289,579 | A | | 2/1994 | Punj |
| 5,557,747 | A | * | 9/1996 | Rogers et al. ................. 709/223 |
| 6,952,737 | B1 | | 10/2005 | Coates et al. |
| 7,006,526 | B1 | | 2/2006 | Biederman |
| 7,222,155 | B1 | | 5/2007 | Gebhardt et al. |
| 7,451,279 | B2 | | 11/2008 | Nakatani et al. |
| 7,634,787 | B1 | * | 12/2009 | Gebhardt et al. ................ 725/36 |
| 7,827,188 | B2 | * | 11/2010 | Howard et al. ................ 707/756 |
| 7,865,676 | B2 | * | 1/2011 | Nagata et al. ................. 711/161 |
| 7,941,564 | B2 | * | 5/2011 | Gebhardt et al. ............. 709/248 |
| 8,380,815 | B2 | * | 2/2013 | Nakamura et al. ............ 709/218 |
| 8,706,986 | B2 | * | 4/2014 | Nagata et al. ................. 711/161 |
| 2003/0097454 | A1 | | 5/2003 | Yamakawa et al. |
| 2003/0115218 | A1 | | 6/2003 | Bobbitt et al. |
| 2004/0133577 | A1 | | 7/2004 | Miloushev et al. |

(Continued)

FOREIGN PATENT DOCUMENTS

| CN | 144354 | 9/2003 |
| JP | 2003-203029 | 7/2003 |
| JP | 2006-119966 | 5/2006 |
| JP | 2007-042115 | 2/2007 |

OTHER PUBLICATIONS

European Search Report for Application No. / Patent No. 08250166.9-1952 / 1973049, issued on Jan. 7, 2014.

*Primary Examiner* — Brian P Whipple
(74) *Attorney, Agent, or Firm* — Antonelli, Terry, Stout & Krauss, LLP.

(57) ABSTRACT

Root node arrangements configured to carry out file level virtualization for logically providing a plurality of share units that can be shared among file systems of the root node or other one or more root nodes, to a client.

19 Claims, 21 Drawing Sheets

(56) References Cited

U.S. PATENT DOCUMENTS

| | | |
|---|---|---|
| 2004/0205152 A1 | 10/2004 | Yasuda et al. |
| 2006/0090042 A1 | 4/2006 | Nakatani et al. |
| 2006/0114931 A1 | 6/2006 | Miyata |
| 2007/0088702 A1 | 4/2007 | Fridella et al. |
| 2008/0235350 A1* | 9/2008 | Nakamura et al. ............ 709/218 |
| 2009/0077201 A1* | 3/2009 | Nakamura et al. ............ 709/219 |

* cited by examiner

FIG. 8

SWITCHING INFORMATION
MANAGEMENT TABLE
800

| SHARE ID | SERVER INFORMATION ID | ALGORITHM INFORMATION ID |
|---|---|---|
| | | |
| | | |
| | | |

SERVER INFORMATION
MANAGEMENT TABLE
900

| SERVER INFORMATION ID | SERVER INFORMATION |
|---|---|
| | |
| | |
| | |

GNS CONFIGURATION
INFORMATION TABLE
1200p

| SHARE ID (1201) | GNS PATH NAME (1202) | SERVER NAME (1203) | SHARE PATH NAME (1204) | SHARE CONFIGURATION INFORMATION (1205) | ALGORITHM INFORMATION ID (1206) |
|---|---|---|---|---|---|
|  |  |  |  |  |  |
|  |  |  |  |  |  |
|  |  |  |  |  |  |

FIG. 13A

| OBJECT ID TYPE (1301) | SHARE ID (1302) | ORIGINAL OBJECT ID (1303) |
|---|---|---|

FIG. 13B (a)

| OBJECT ID TYPE (1301) | SHARE ID (1302) | POST-CONVERSION ORIGINAL OBJECT ID (1304) |
|---|---|---|

BACKWARD CONVERSION ↓    FORWARD CONVERSION ↑

(b)

| ORIGINAL OBJECT ID (1305) |
|---|

ROOT NODE FOR FILE LEVEL VIRTUALIZATION

CROSS-REFERENCE TO PRIOR APPLICATION

This is a continuation of U.S. application Ser. No. 11/972,653, filed Jan. 11, 2008. This application relates to and claims priority from Japanese Patent Application No. 2007-076867, filed on Mar. 23, 2007. The entirety of the contents and subject matter of all of the above is incorporated herein by reference.

BACKGROUND

The present invention generally relates to file level virtualization.

A file server is an information processing apparatus, which generally provides file services via a communications network. A file server must be operationally managed so that a user can make smooth use of the file services. When a plurality of file servers are introduced pursuant to an increase in files being stored, the cost of operationally managing the file servers, as well as operationally managing the clients that make use of the respective file servers, increases.

Operational management costs for a client, for example, involve the mounting of a share unit (logical public unit) provided by a file server. If a new file server is introduced and the number of share units increases, the number of times that mounting work is carried out by the client will increase accordingly. To reduce this cost, there is technology for virtualizing a plurality of share units provided by a plurality of file servers as a single namespace, that is, file level virtualization technology. This single namespace is generally called a global namespace (GNS).

A method, which utilizes an information processing device that is logically arranged between a client and a file server (hereinafter, "root node"), is one file level virtualization technology that is known (Japan Patent Laid-open No. 2003-203029, for example, referred to hereinafter as Literature 1). The root node performs processing, which consolidates a plurality of shared directories provided by a plurality of file servers, constructs a pseudo file system, and when there is a request from a client for a prescribed file or other such object, transfers the request to the file server in which this object resides.

When a client requests an operation for a desired object to a file server, generally speaking, an identifier called an object ID is used to identify this desired object. For example, in the case of the file sharing protocol NFS (Network File System), an object ID called a file handle is used.

Because an object ID is created by an internal file server rule, when the shared directories of a plurality of file servers are consolidated, there is the likelihood that these object IDs will compete. In Literature 1, this competition is avoided by inserting file server identification information and algorithm identification information into an object ID.

However, in the technology disclosed in Literature 1, the problem is that because the root node must carry out object ID conversion, the processing load on the root node intensifies, making the root node a throughput bottleneck and lowering the overall performance of the system (responsiveness relative to a client).

Further, in the technology disclosed in Literature 1, when executing file system migration for moving data between file servers, the root node must maintain an object ID conversion table (a table that associates a migration source with a migration destination) in file units. Therefore, when deciding the destination of a request from a client, the root node must reference a table in which is recorded a huge number of entries proportional to the number of files. Thus, the processing load on the root node is heightened.

SUMMARY

Therefore, an object of the present invention is to reduce the processing load of a root node, which carries out file level virtualization.

Other objects of the present invention should become clear from the following explanation.

Share information is inserted in an object ID exchanged between a client and a root node. All root nodes and a portion of leaf nodes create and issue an object ID comprising share information when an object ID is created. At least a leaf node is a file server. When a root node has a function as a file server, another root node can become a leaf node.

Share information is information depicting a share unit, which is a logical public unit, and, for example, is an identifier (share ID) for identifying this share unit. A share unit comprises one or more objects, and generally no less than two objects.

Transfer control information denoting the transfer destination device for each share unit is stored in a storage resource of a root node. Transfer control information, for example, is a table, and shows a corresponding relationship between share information and device information corresponding to a transfer destination device (a root node or a leaf node). Share information and device information need not be on a one-to-one basis, and can be one-to-many instead.

A root node receives request data having an object ID from the client, specifies the transfer destination device by referencing the above-mentioned transfer control information, and transfers the request data to the specified transfer destination device. More specifically, the root node uses the share information in this object ID to reference the transfer control information, selects information of one device from the information of one or more devices corresponding to this share information, and transfers the request data to a leaf node or another root node specified from the selected information of one device.

BRIEF DESCRIPTION OF THE DRAWINGS

FIG. 8 is a diagram showing an example of the constitution of a switching information management table;

FIG. 9 is a diagram showing an example of the constitution of a server information management table;

FIG. 12 is a diagram showing an example of the constitution of a GNS configuration information table;

FIG. 13A is a diagram showing an example of an object ID exchanged in the case of an extended format OK;

FIG. 13B (a) is a diagram showing an example of an object ID exchanged between a client and a root node, and between a root node and a root node in the case of an extended format NG;

FIG. 13B (b) is a diagram showing an example of an object ID exchanged between a root node and a leaf node in the case of an extended format NG;

DETAILED DESCRIPTION OF THE PREFERRED EMBODIMENTS

Figure 1:
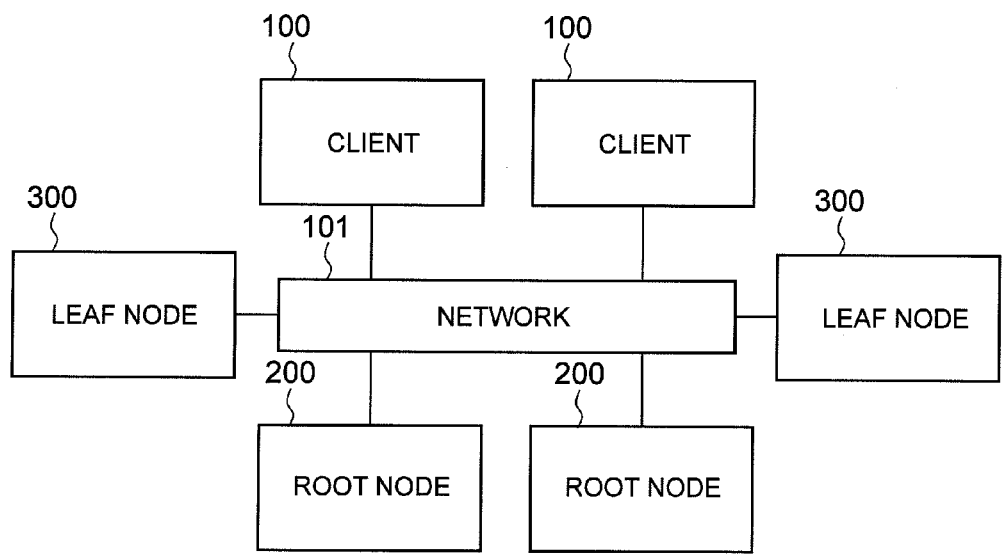
FIG. 1 is a diagram showing an example of the constitution of a computer system comprising a root node related to a first embodiment of the present invention.

In one embodiment, a root node comprises a request data receiving module, and a request transfer processing module. The request data receiving module receives from either a client or another root node request data having an object ID comprising share information (for example, an ID) showing a share unit. The request transfer processing module uses the share information in the object ID of the request data to reference transfer control information. In the transfer control information, the share information is associated with information of one or more devices (for example, a device ID of one or more devices), which denotes for each share unit one or more either leaf nodes or root nodes, being the file server that is managing this share unit. The request transfer processing module selects information of one device from the information of one or more devices corresponding to the share information in the object ID having the received request data, and transfers the request data to either a leaf node or another root node corresponding to this selected information of one device.

In one embodiment, if the device corresponding to the selected piece of device information is either another root node, or a leaf node capable of interpreting an object ID having a format comprising share information, the request transfer processing module can transfer the received request data as-is to the other root node or the leaf node.

In one embodiment, in the transfer control information, algorithm information for specifying the method for convert-ing an object ID in communication with a specified leaf node, which is not able to interpret an object ID having a format comprising share information, is associated with the device information corresponding to this specified leaf node. The request transfer processing module can specify the algorithm information corresponding to the selected piece of device information from the transfer control information, use a conversion algorithm corresponding to the specified algorithm information to convert the object ID included in the request data, and transfer the request data having this post-conversion object ID to a specified leaf node corresponding to the selected piece of device information.

In one embodiment, an object ID in the request data comprises an object specific value for identifying an object in either a leaf node or a root node, which manages a share unit corresponding to the share information in this object ID. A root node can further comprise a response data receiving module that receives response data comprising an object ID from either a leaf node or another root node in response to the transfer of the request data; and a response processing module that sends the received response data to either a client or another root node. The request transfer processing module can remove the share information from the object ID of the request data in accordance with a conversion algorithm corresponding to algorithm information that corresponds to the selected piece of device information, and can transfer the request data having the post-conversion object ID to a specified leaf node. The response processing module can include the above-mentioned removed share information in an object ID in the response data received from the specified leaf node, and can send response data which has this object ID comprising this share information, to either a client or another root node. In this embodiment, for example, the size of an object ID can be either a fixed length or a variable length.

In one embodiment, the request transfer processing module, in addition to removing the share information in an object ID of request data, can also carry out first conversion processing for enlarging the size of the object specific value in this object ID from a first size to a second size, and can send the above-mentioned request data, which comprises the post-size expansion object specific value as an object ID, to the above-mentioned specified leaf node. The response processing module can carry out a second conversion processing for reducing the size of the object specific value contained in the response data from the second size to the first size, and can send response data, which comprises as the above-mentioned object ID an information group comprising the post-size reduction object specific value and the above-mentioned removed share information, to either a client or another root node. In this embodiment, for example, the size of an object ID is a fixed length.

In one embodiment, a root node further comprises a response data receiving module that receives response data comprising an object ID from either a leaf node or another root node in response to the transfer of request data; and a response processing module that sends received response data to either a client or another root node. The response processing module can reference connection management information, which denotes the corresponding relationship between a first object ID of a first object contained in a first share unit, and a second object ID of a second object, which is contained in a second share unit, and which is virtually the same as the above-mentioned first object, can determine whether or not the object ID in the received response data is contained in this connection management information, and when this object ID is contained in this connection management information, can acquire another object ID corresponding to this object ID, and can change the object ID contained in the response data to the acquired other object ID.

In one embodiment, a root node can further comprise an object management module, which manages an object, and which provides file services for utilizing this object. When the request transfer processing module references the transfer control information according to the share information contained in an object ID of the request data, if the request transfer processing module determines that an object corresponding to this object ID is managed by the object management module, the request transfer processing module can require the object management module to execute an operation in accordance with the request data. The determination here that the object corresponding to this object ID is being managed by the object management module, for example, can be made when device information corresponding to this share information is not contained in the transfer control information, or when the device information denotes the root node itself. An operation in accordance with the request data, for example, can include either an update (write) or a reference (read) relative to an object that the object management module is managing itself.

In one embodiment, a root node can further comprise a share information registration module that registers, in a storage area, share information corresponding to a share unit, which is targeted for access suspension; a suspension determination module that carries out a determination as to whether or not share information, which coincides with the share information in an object ID of the received request data is registered in the storage area; and a response processing module, which, if the result of the determination is positive (that is, if the determination is that the share information is registered), creates response data indicating that it is not possible to access the object corresponding to the object ID, and sends this response data to either a client or another root node. The request transfer processing module can, if the above-mentioned determination result is negative, carry out the transfer of the request data based on the transfer control information.

In one embodiment, the share information registration module can register, in a storage area, share information corresponding to a share unit, which is specified as a migration target.

In one embodiment, a root node can further comprise a first update module, which updates namespace definition information in accordance with a namespace definition information update request, and a second update module, which updates the transfer control information to the transfer control information comprising the decided share information based on the update of the namespace definition information. The root node can further comprise an update request receiving module, which receives a request for an update of the namespace definition information related to the definition of the configuration of a virtual namespace; a share information decision module, which decides the share information for a share unit related to the update of the namespace definition information; and a definition information synchronization module, which sends information related to the update of the namespace definition information, decided share information, and a request to update namespace definition information in another root node to this other root node.

In one embodiment, a root node can further comprise an unmount module, which unmounts a share unit corresponding to share information specified as a migration target. Also, the root node can further comprise a mount module, which mounts the above-mentioned migration target share unit, which is in an unmounted state, when the root node itself is the leaf node or root node specified as the migration destination. The first update module can execute a namespace definition information update related to the unmounting and mounting of a migration target share unit. The second update module can, based on the update of namespace definition information, update transfer control information in transfer control information in which share information specified as a migration target is associated with device information corresponding to either a leaf node or a root node specified as the migration destination.

In one embodiment, the first update module can use the above-mentioned namespace definition information to associate information related to a replication target share unit with information related to either a leaf node or a root node specified as the replication destination. The second update module can, based on the update of namespace definition information, update the above-mentioned transfer control information in transfer control information, in which share information specified as a replication target is associated with device information corresponding to either a leaf node or a root node specified as the replication destination. Furthermore, the root node can further comprise a reproduction mount request module, which sends a request to mount a reproduction of a replication target share unit in either a leaf node or a root node specified as the replication destination, to either this leaf node or root node. The root node can further comprise a reproduction preparation module, which prepares a reproduction of a replication target share unit; and a mount module, which mounts the share unit reproduction in the device itself, when the device is specified as said replication destination.

In one embodiment, a root node can further comprise a response data receiving module; and a response processing module. The response data receiving module can receive response data comprising an object ID from either a leaf node or another root node in response to the transfer of request data. When share information is not contained in the object ID of the received response data, the response processing module can acquire share information corresponding to device information denoting either a leaf node or another root node from the transfer control information, can include the acquired share information in the object ID of the received response data, and can send the response data having the object ID comprising the share information to the transmission source of the request data.

In one embodiment, a root node can further comprise an object ID notification module. An object ID notification module receives an object query from a client, and can create an object ID, which comprises an object specific value, which is a value specific to an object specified in this object query, and share information showing a share unit having this object, and can notify this object ID to the above-mentioned client. The request data receiving module can receive request data comprising this notified object ID.

Any two or more of the plurality of embodiments described above may be combined. At least one of all of the modules (request data receiving module, request transfer processing module, response data receiving module, response processing module, and so forth) can be constructed from hardware, computer programs, or a combination thereof (for example, some can be implemented via computer programs, and the remainder can be implemented using hardware). A computer program is read in and executed by a prescribed processor. Further, when a computer program is read into a processor and information processing is executed, a storage region that resides in memory or some other such hardware resource can also be used. Further, a computer program can be installed in a computer from a CD-ROM or other such recording medium, or it can be downloaded to a computer via a communications network.

A number of embodiments of the present invention will be explained in detail hereinbelow by referring to the figures.

<First Embodiment>

FIG. 1 is a diagram showing an example of the constitution of a computer system comprising a root node related to a first embodiment of the present invention.

At least one client 100, at least one root node 200, and at least one leaf node 300 are connected to a communications network (for example, a LAN (Local Area Network)) 101. The leaf node 300 can be omitted altogether.

The leaf node 300 is a file server, which provides the client 100 with file services, such as file creation and deletion, file reading and writing, and file movement.

The client 100 is a device, which utilizes the file services provided by either the leaf node 300 or the root node 200.

The root node 200 is located midway between the client 100 and the leaf node 300, and relays a request from the client 100 to the leaf node 300, and relays a response from the leaf node 300 to the client 100. A request from the client 100 to either the root node 200 or the leaf node 300 is a message signal for requesting some sort of processing (for example, the acquisition of a file or directory object, or the like), and a response from the root node 200 or the leaf node 300 to the client 100 is a message signal for responding to a request. Furthermore, the root node 200 can be logically positioned between the client 100 and the leaf node 300 so as to relay communications therebetween. The client 100, root node 200 and leaf node 300 are connected to the same communications network 101, but logically, the root node 200 is arranged between the client 100 and the leaf node 300, and relays communications between the client 100 and the leaf node 300.

The root node 200 not only possesses request and response relay functions, but is also equipped with file server functions for providing file service to the client 100. The root node 200 constructs a virtual namespace when providing file services, and provides this virtual namespace to the client 100. A virtual namespace consolidates all or a portion of the sharable file systems of a plurality of root nodes 200 and leaf nodes 300, and is considered a single pseudo file system. More specifically, for example, when one part (X) of a file system (directory tree) managed by a certain root node 200 or leaf node 300 is sharable with a part (Y) of a file system (directory tree) managed by another root node 200 or leaf node 300, the root node 200 can construct a single pseudo file system (directory tree) comprising X and Y, and can provide this pseudo file system to the client 100. In this case, the single pseudo file system (directory tree) comprising X and Y is a virtualized namespace. A virtualized namespace is generally called a GNS (global namespace). Thus, in the following explanation, a virtualized namespace may be called a "GNS". Conversely, a file system respectively managed by the root node 200 and the leaf node 300 may be called a "local file system". In particular, for example, for the root node 200, a local file system managed by this root node 200 may be called "own local file system", and a local file system managed by another root node 200 or a leaf node 300 may be called "other local file system".

Further, in the following explanation, a sharable part (X and Y in the above example), which is either all or a part of a local file system, that is, the logical public unit of a local file system, may be called a "share unit". In this embodiment, a share ID, which is an identifier for identifying a share unit, is allocated to each share unit, and the root node 200 can use a share ID to transfer a file access request from the client 100. A share unit comprises one or more objects (for example, a directory or file).

Further, in this embodiment, one of a plurality of root nodes 200 can control the other root nodes 200. Hereinafter, this one root node 200 is called the "parent root node 200p", and a root node 200 controlled by the parent root node is called a "child root node 200c". This parent-child relationship is determined by a variety of methods. For example, the root node 200 that is initially booted up can be determined to be the parent root node 200p, and a root node 200 that is booted up thereafter can be determined to be a child root node 200c. A parent root node 200p, for example, can also be called a master root node or a server root node, and a child root node 200c, for example, can also be called a slave root node or a client root node.

Figure 2:
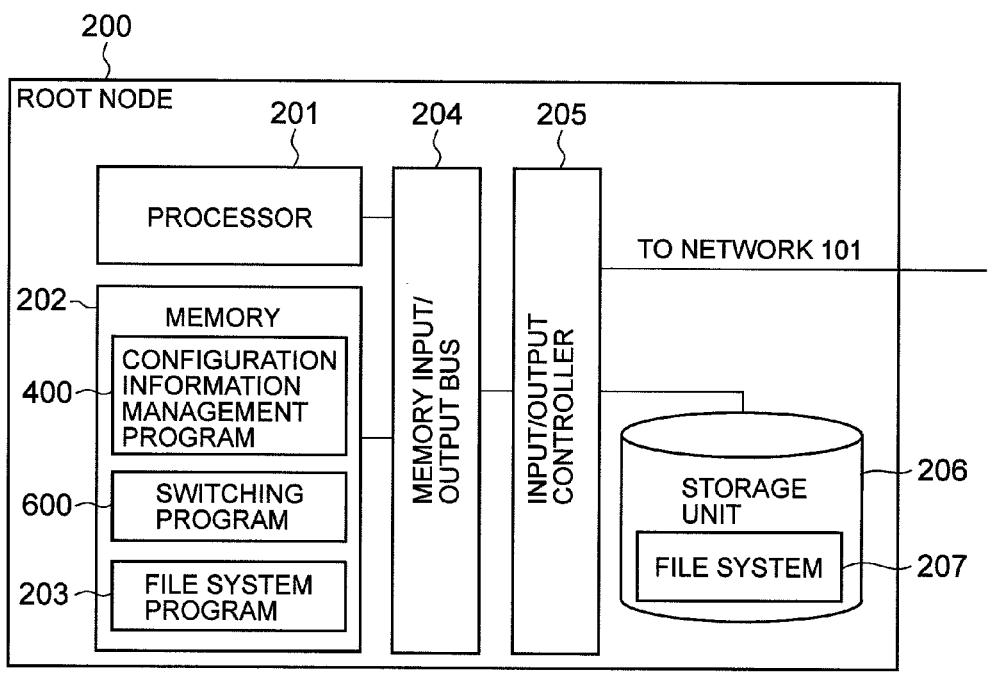
FIG. 2 is a block diagram showing an example of the constitution of a root node.

FIG. 2 is a block diagram showing an example of the constitution of a root node 200.

A root node 200 comprises at least one processor (for example, a CPU) 201; a memory 202; a memory input/output bus 204, which is a bus for input/output to/from the memory 202; an input/output controller 205, which controls input/output to/from the memory 202, a storage unit 206, and the communications network 101; and a storage unit 206. The memory 202, for example, stores a configuration information management program 400, a switching program 600, and a file system program 203 as computer programs to be executed by the processor 201. The storage unit 206 can be a logical storage unit (a logical volume), which is formed based on the storage space of one or more physical storage units (for example, a hard disk or flash memory), or a physical storage unit. The storage unit 206 comprises at least one file system 207, which manages files and other such data. A file can be stored in the file system 207, or a file can be read out from the file system 207 by the processor 201 executing the file system program 203. Hereinafter, when a computer program is the subject, it actually means that processing is being executed by the processor, which executes this computer program.

The configuration information management program 400 is constituted so as to enable the root node 200 to behave either like a parent root node 200p or a child root node 200c. Hereinafter, the configuration information management program 400 will be notated as the "parent configuration information management program 400p" when the root node 200 behaves like a parent root node 200p, and will be notated as the "child configuration information management program 400c" when the root node 200 behaves like a child root node 200c. The configuration information management program 400 can also be constituted such that the root node 200 only behaves like either a parent root node 200p or a child root node 200c. The configuration information management program 400 and switching program 600 will be explained in detail hereinbelow.

Figure 3:
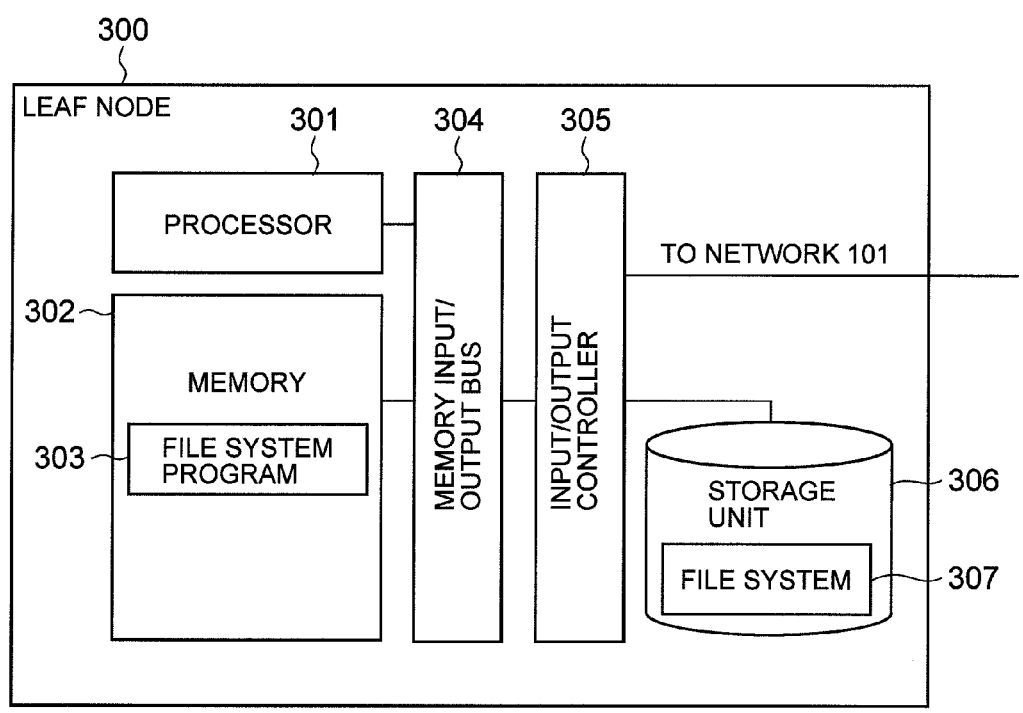
FIG. 3 is a block diagram showing an example of the constitution of a leaf node.

FIG. 3 is a block diagram showing an example of the constitution of a leaf node 300.

A leaf node 300 comprises at least one processor 301; a memory 302; a memory input/output bus 304; an input/output controller 305; and a storage unit 306. The memory 302 comprises a file system program 303. Although not described in this figure, the memory 302 can further comprise a configuration information management program 400. The storage unit 306 stores a file system 307.

Since these components are basically the same as the components of the same names in the root node 200, explanations thereof will be omitted. Furthermore, the storage unit 306 can also exist outside of the leaf node 300. That is, the leaf node 300, which has a processor 301, can be separate from the storage unit 306.

Figure 4:
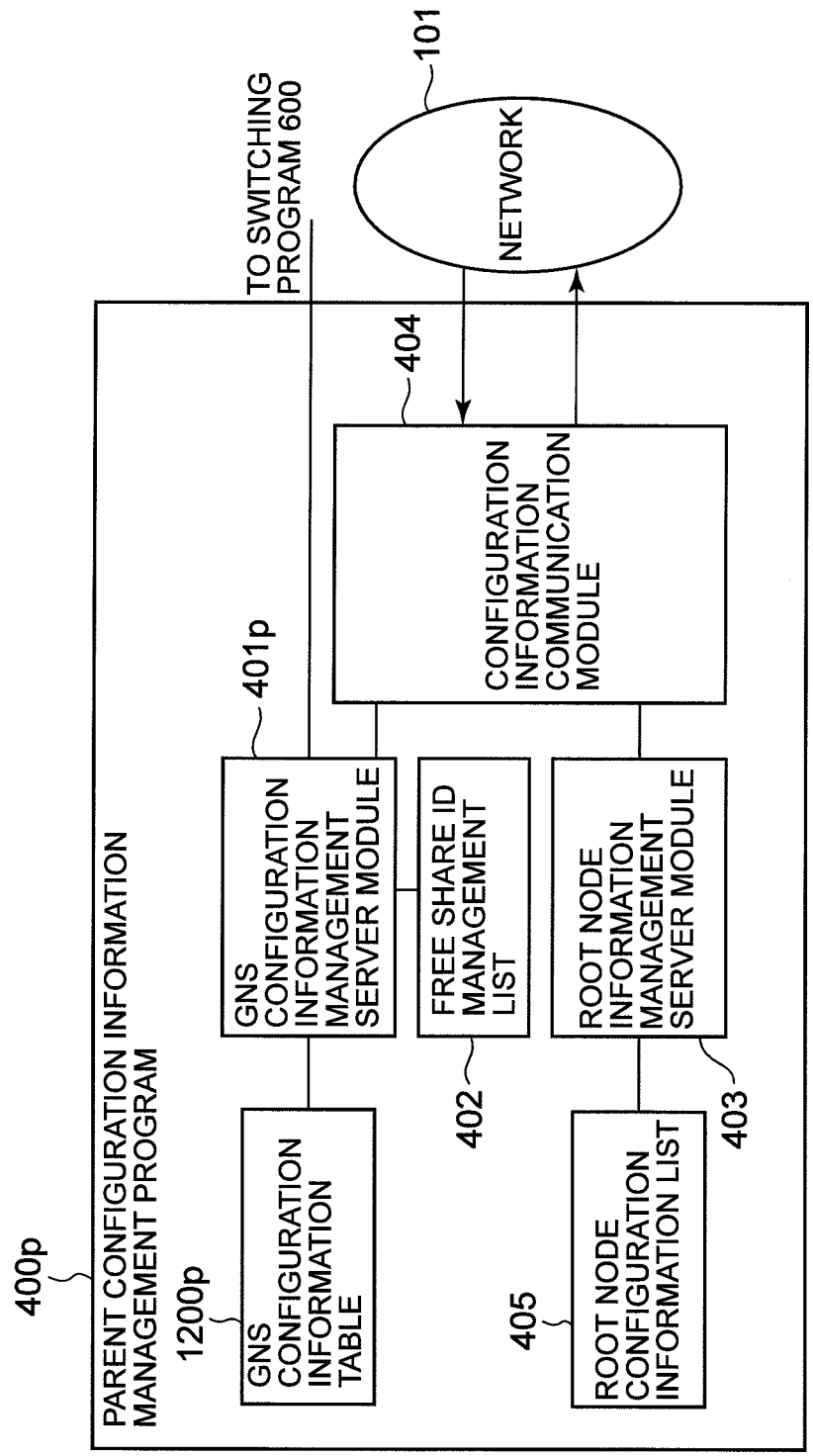
FIG. 4 is a block diagram showing a parent configuration information management program.

FIG. 4 is a block diagram showing an example of the constitution of a parent configuration information management program 400$p$.

A parent configuration information management program 400$p$ comprises a GNS configuration information management server module 401$p$; a root node information management server module 403; and a configuration information communications module 404, and has functions for referencing a free share ID management list 402, a root node configuration information list 405, and a GNS configuration information table 1200$p$. Lists 402 and 405, and GNS configuration information table 1200$p$ can also be stored in the memory 202.

The GNS configuration information table 1200$p$ is a table for recording GNS configuration definitions, which are provided to a client 100. The details of the GNS configuration information table 1200$p$ will be explained hereinbelow.

The free share ID management list 402 is an electronic list for managing a share ID that can currently be allocated. For example, a share ID that is currently not being used can be registered in the free share ID management list 402, and, by contrast, a share ID that is currently in use can also be recorded in the free share ID management list 402.

The root node configuration information list 405 is an electronic list for registering information (for example, an ID for identifying a root node 200) related to each of one or more root nodes 200.

Figure 5:
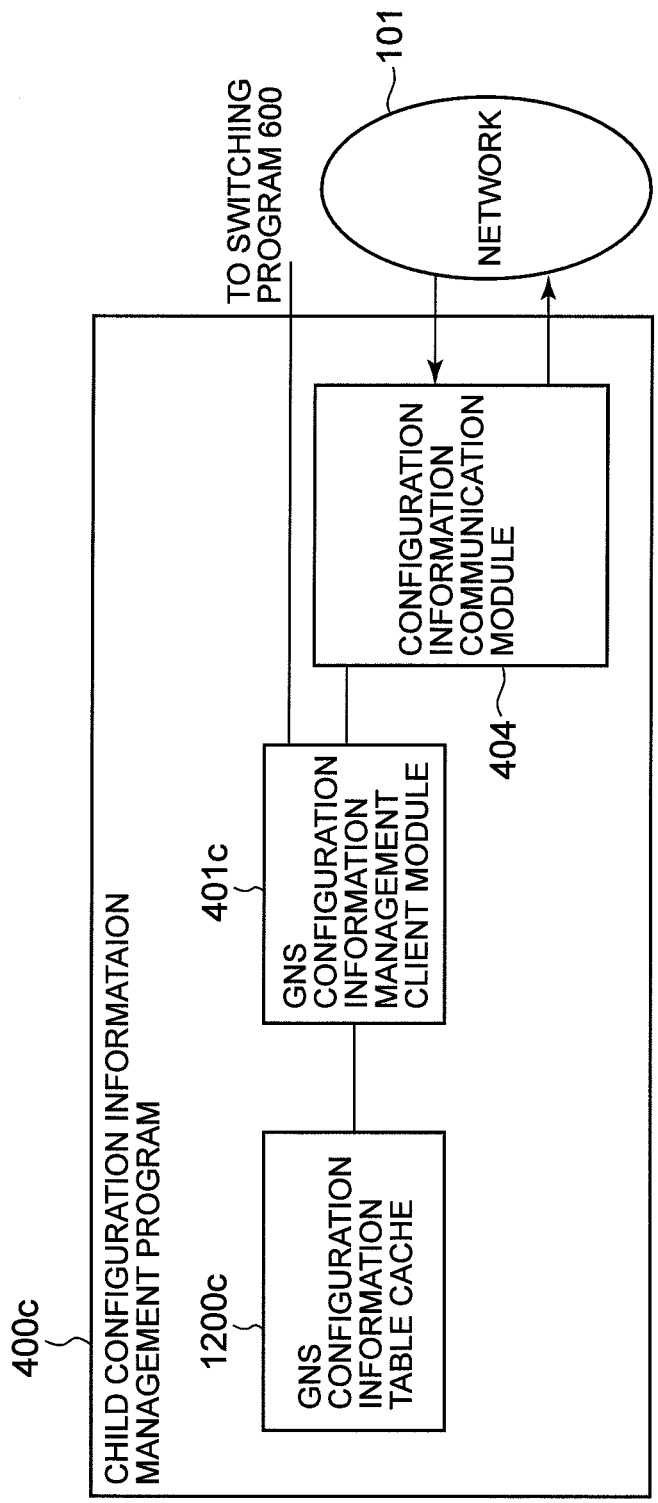
FIG. 5 is a block diagram showing an example of the constitution of a child configuration information management program.

FIG. 5 is a block diagram showing an example of the constitution of a child configuration information management program 400$c$.

A child configuration information management program 400$c$ comprises a GNS configuration information management client module 401$c$; and a configuration information communications module 404, and has a function for registering information in a GNS configuration information table cache 1200$c$.

A GNS configuration information table cache 1200$c$, for example, is prepared in the memory 202 (or a register of the processor 201). Information of basically the same content as that of the GNS configuration information table 1220$p$ is registered in this cache 1200$c$. More specifically, the parent configuration information management program 400$p$ notifies the contents of the GNS configuration information table 1200$p$ to a child root node 200$c$, and the child configuration information management program 400$c$ of the child root node 200$c$ registers these notified contents in the GNS configuration information table cache.

Figure 6:
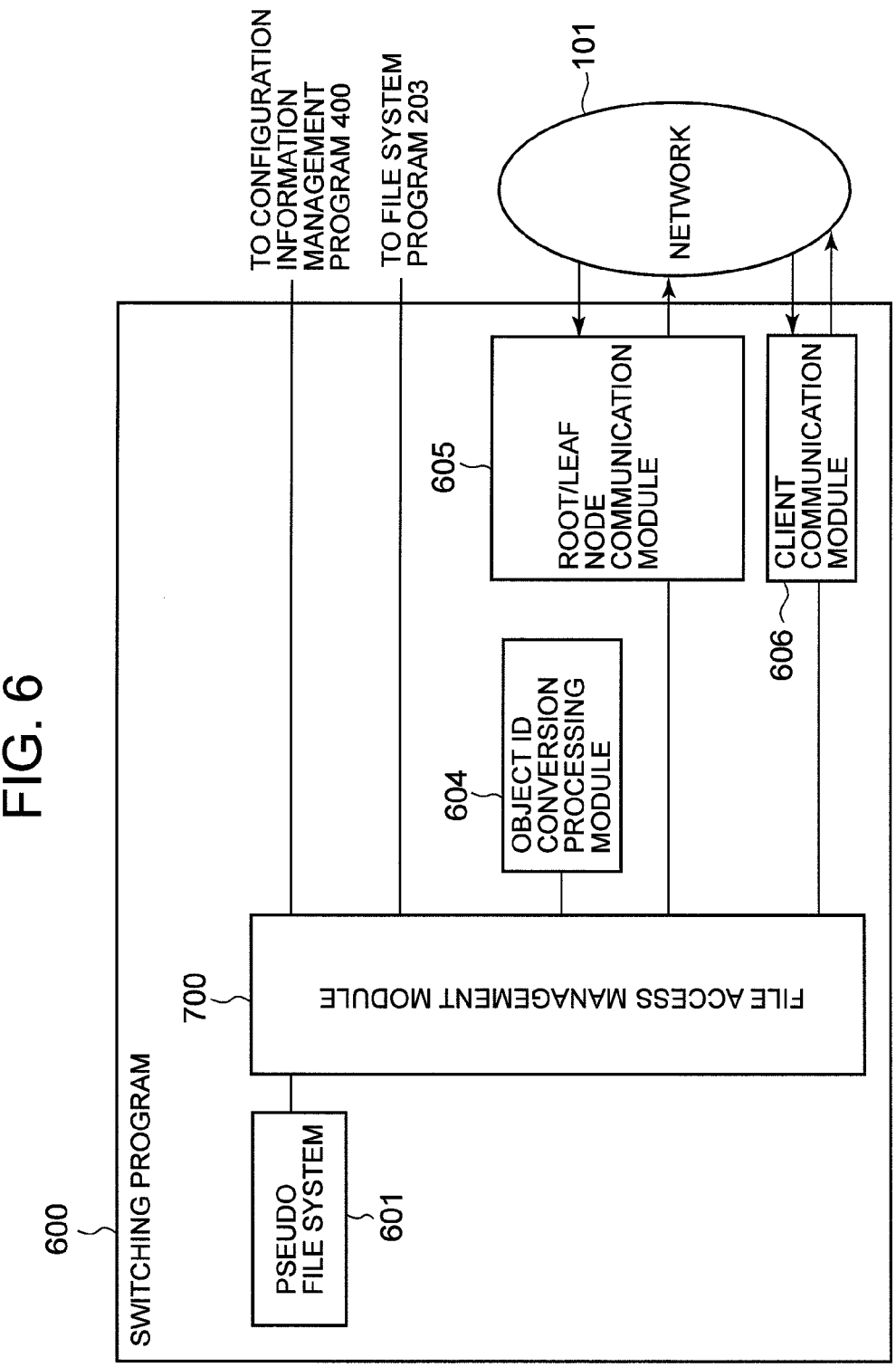
FIG. 6 is a block diagram showing an example of the constitution of a switching program.

FIG. 6 is a block diagram showing an example of the constitution of the switching program 600.

The switching program 600 comprises a client communications module 606; an root/leaf node communications module 605; a file access management module 700; an object ID conversion processing module 604; and a pseudo file system 601.

The client communications module 606 receives a request (hereinafter, may also be called "request data") from the client 100, and notifies the received request data to the file access management module 700. Further, the client communications module 606 sends the client 100 a response to the request data from the client 100 (hereinafter, may also be called "response data") notified from the file access management module 700.

The root/leaf node communications module 605 sends data (request data from the client 100) outputted from the file access management module 700 to either the root node 200 or the leaf node 300. Further, the root/leaf node communications module 605 receives response data from either the root node 200 or the leaf node 300, and notifies the received response data to the file access management module 700.

The file access management module 700 analyzes request data notified from the client communications module 606, and decides the processing method for this request data. Then, based on the decided processing method, the file access management module 700 notifies this request data to the root/leaf node communications module 605. Further, when a request from the client 100 is a request for a file system 207 of its own (own local file system), the file access management module 700 creates response data, and notifies this response data to the client communications module 606. Details of the file access management module 700 will be explained hereinbelow.

The object ID conversion processing module 604 converts an object ID contained in request data received from the client 100 to a format that a leaf node 300 can recognize, and also converts an object ID contained in response data received from the leaf node 300 to a format that the client 100 can recognize. These conversions are executed based on algorithm information, which will be explained hereinbelow.

The pseudo file system 601 is for consolidating either all or a portion of the file system data 207 of the root node 200 or the leaf node 300 to form a single pseudo file system. For example, a root directory and a prescribed directory are configured in the pseudo file system 601, and the pseudo file system 601 is created by mapping a directory managed by either the root node 200 or the leaf node 300 to this prescribed directory.

Figure 7:
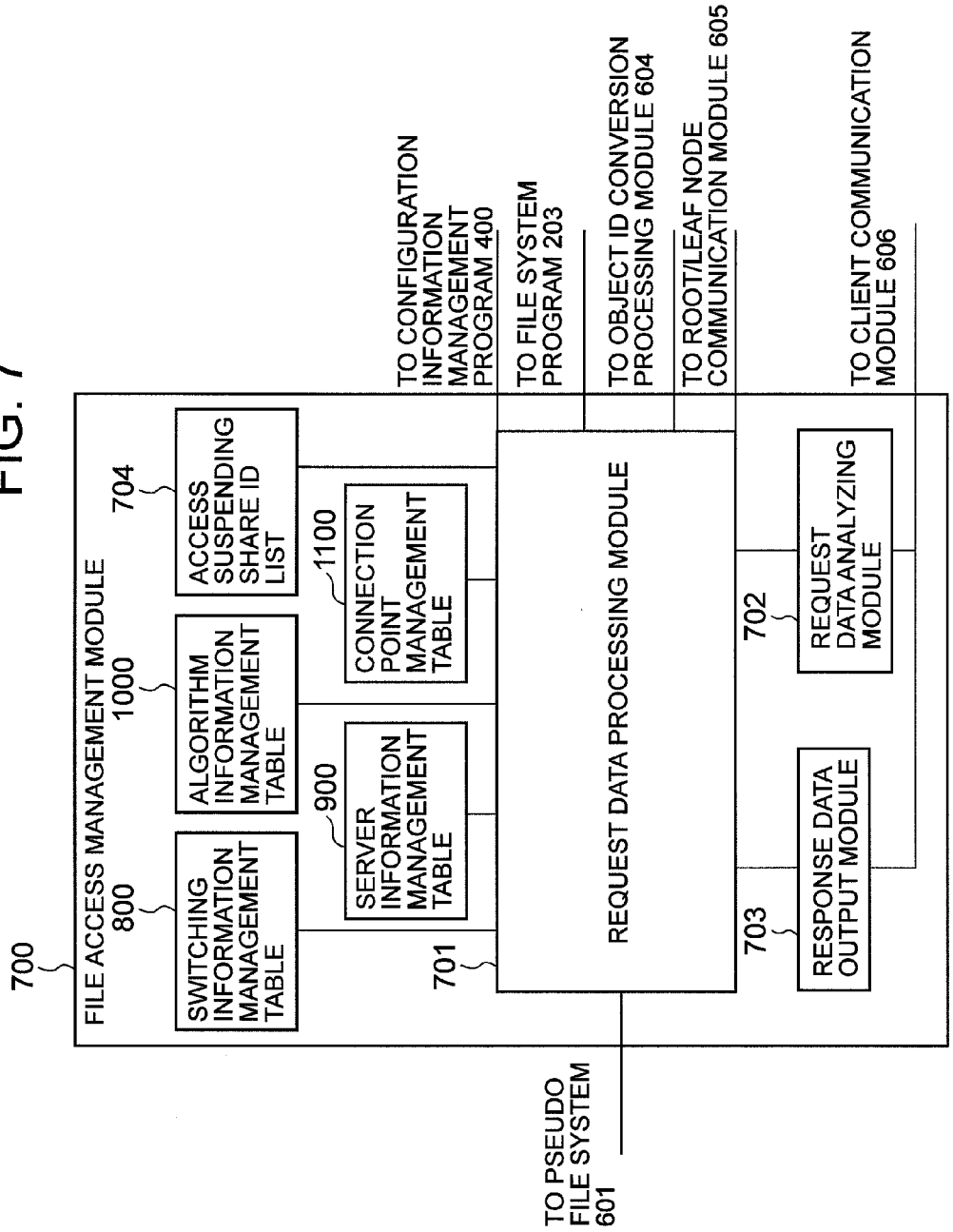
FIG. 7 is a block diagram showing an example of the constitution of file access management module.

FIG. 7 is a block diagram showing an example of the constitution of the file access management module 700.

The file access management module 700 comprises a request data analyzing module 702; a request data processing module 701; and a response data output module 703, and has functions for referencing a switching information management table 800, a server information management table 900, an algorithm information management table 1000, a connection point management table 1100, and an access suspending share ID list 704.

The switching information management table 800, server information management table 900, algorithm information management table 1000, and connection point management table 1100 will be explained hereinbelow.

The access suspending share ID list 704 is an electronic list for registering a share ID to which access has been suspended. For example, the share ID of a share unit targeted for migration is registered in the access suspending share ID list 704 either during migration preparation or implementation, and access to the object in this registered share unit is suspended.

The request data analyzing module 702 analyzes request data notified from the client communications module 606. Then, the request data analyzing module 702 acquires the object ID from the notified request data, and acquires the share ID from this object ID.

The request data processing module 701 references arbitrary information from the switching information management table 800, server information management table 900, algorithm information management table 1000, connection point management table 1100, and access suspending share ID list 704, and processes request data based on the share ID acquired by the request data analyzing module 702.

The response data output module 703 converts response data notified from the request data processing module 701 to a format to which the client 100 can respond, and outputs the reformatted response data to the client communications module 606.

FIG. 8 is a diagram showing an example of the constitution of the switching information management table 800.

The switching information management table 800 is a table, which has entries constituting groups of a share ID 801, a server information ID 802, and an algorithm information ID 803. A share ID 801 is an ID for identifying a share unit. A server information ID 802 is an ID for identifying server information. An algorithm information ID 803 is an ID for identifying algorithm information. The root node 200 can acquire a server information ID 802 and an algorithm information ID 803 corresponding to a share ID 801, which coincides with a share ID acquired from an object ID. In this table 800, a plurality of groups of server information IDs 802 and algorithm information IDs 803 can be registered for a single share ID 801.

FIG. 9 is a diagram showing an example of the constitution of the server information management table 900.

The server information management table 900 is a table, which has entries constituting groups of a server information ID 901 and server information 902. Server information 902, for example, is the IP address or socket structure of the root node 200 or the leaf node 300. The root node 200 can acquire server information 902 corresponding to a server information ID 901 that coincides with an acquired server information ID 702, and from this server information 902, can specify the processing destination of a request from the client 100 (for example, the transfer destination).

Figure 10:
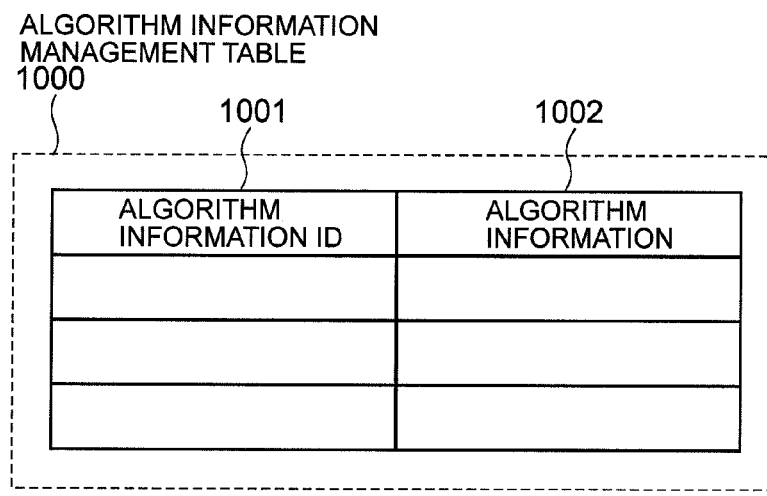
FIG. 10 is a diagram showing an example of the constitution of an algorithm information management table.

FIG. 10 is a diagram showing an example of the constitution of the algorithm information management table 1000.

The algorithm information management table 1000 is a table, which has entries constituting groups of an algorithm information ID 1001 and algorithm information 1002. Algorithm information 1002 is information showing an object ID conversion mode. The root node 200 can acquire algorithm information 1002 corresponding to an algorithm information ID 1001 that coincides with an acquired algorithm information ID 1001, and from this algorithm information 1002, can specify how an object ID is to be converted.

Furthermore, in this embodiment, the switching information management table 800, server information management table 900, and algorithm information management table 1000 are constituted as separate tables, but these can be constituted as a single table by including server information 902 and algorithm information 1002 in a switching information management table 800.

Figure 11:
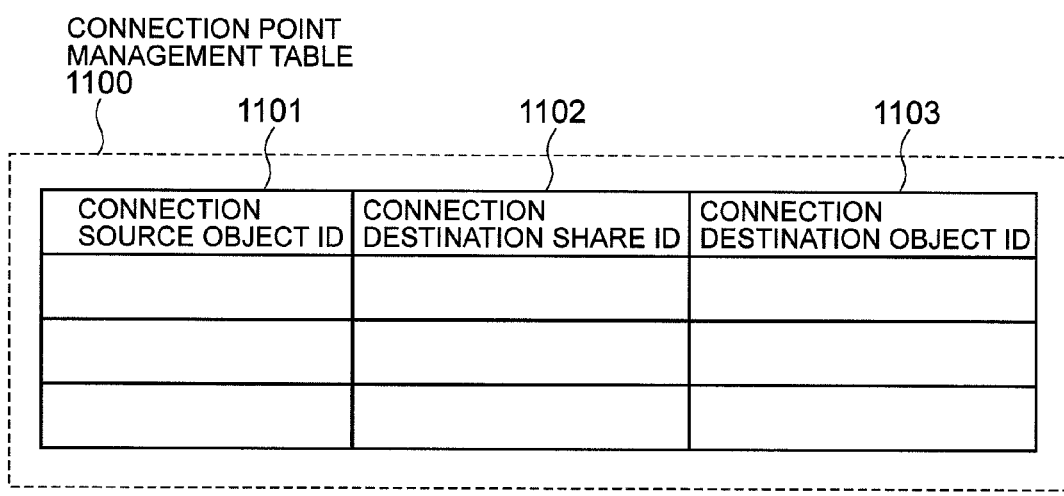
FIG. 11 is a diagram showing an example of the constitution of a connection point management table.

FIG. 11 is a diagram showing an example of the constitution of the connection point management table 1100.

The connection point management table 1100 is a table, which has entries constituting groups of a connection source object ID 1101, a connection destination share ID 1102, and a connection destination object ID 1103. By referencing this table, the root node 200 can just access a single share unit for the client 100 even when the access extends from a certain share unit to another share unit. Furthermore, the connection source object ID 1101 and connection destination object ID 1103 here are identifiers (for example, file handles or the like) for identifying an object, and can be exchanged with the client 100 by the root node 200, or can be such that an object is capable of being identified even without these object IDs 1101 and 1103 being exchanged between the two.

FIG. 12 is a diagram showing an example of the constitution of the GNS configuration information table 1200.

The GNS configuration information table 1200 is a table, which has entries constituting groups of a share ID 1201, a GNS path name 1202, a server name 1203, a share path name 1204, share configuration information 1205, and an algorithm information ID 1206. This table 1200, too, can have a plurality of entries comprising the same share ID 1201, the same as in the case of the switching information management table 800. The share ID 1201 is an ID for identifying a share unit. A GNS path name 1202 is a path for consolidating share units corresponding to the share ID 1201 in the GNS. The server name 1203 is a server name, which possesses a share unit corresponding to the share ID 1201. The share path name 1204 is a path name on the server of the share unit corresponding to the share ID 1201. Share configuration information 1205 is information related to a share unit corresponding to the share ID 1201 (for example, information set in the top directory (root directory) of a share unit, more specifically, for example, information for showing read only, or information related to limiting the hosts capable of access). An algorithm information ID 1206 is an identifier of algorithm information, which denotes how to carry out the conversion of an object ID of a share unit corresponding to the share ID 1201.

FIG. 13A is a diagram showing an example of an object ID exchanged in the case of an extended format OK. FIG. 13B is a diagram showing an object ID exchanged in the case of an extended format NG.

An extended format OK case is a case in which a leaf node 300 can interpret the object ID of share ID type format, an extended format NG case is a case in which a leaf node 300 cannot interpret the object ID of share ID type format, and in each case the object ID exchanged between devices is different.

Share ID type format is format for an object ID, which extends an original object ID, and is prepared using three fields. An object ID type 1301, which is information showing the object ID type, is written in the first field. A share ID 1302 for identifying a share unit is written in the second field. In an extended format OK case, an original object ID 1303 is written in the third field as shown in FIG. 13A, and in an extended format NG case, a post-conversion original object ID 1304 is written in the third field as shown in FIG. 13B (a).

The root node 200 and some leaf nodes 300 can create an object ID having share ID type format. In an extended format OK case, share ID type format is used in exchanges between the client 100 and the root node 200, the root node 200 and a root node 200, and between the root node 200 and the leaf node 300, and the format of the object ID being exchanged does not change. As described hereinabove, in an extended format OK case, the original object ID 1303 is written in the third field, and this original object ID 1303 is an identifier (for example, a file ID) for either the root node 200 or the leaf node 300, which possesses the object, to identify this object in this root node 200 or leaf node 300.

Conversely, in an extended format NG case, an object ID having share ID type format as shown in FIG. 13B (a) is exchanged between the client 100 and the root node 200, and between the root node 200 and a root node 200, and a post-conversion original object ID 1304 is written in the third field as described above. Then, an exchange is carried out between the root node 200 and the leaf node 300 using an original object ID 1305 capable of being interpreted by the leaf node 300 as shown in FIG. 13B (b). That is, in an extended format NG case, upon receiving an original object ID 1305 from the leaf node 300, the root node 200 carries out a forward conversion, which converts this original object ID 1305 to information (a post-conversion object ID 1304) for recording in the third field of the share ID type format. Further, upon receiving an object ID having share ID type format, a root node 200 carries out backward conversion, which converts the information written in the third field to the original object ID 1305. Both forward conversion and backward conversion are carried out based on the above-mentioned algorithm information 1002.

More specifically, for example, the post-conversion original object ID 1304 is either the original object ID 1305 itself, or is the result of conversion processing being executed on the basis of algorithm information 1002 for either all or a portion of the original object ID 1305. For example, if the object ID is a variable length, and a length, which adds the length of the first and second fields to the length of the original object ID 1305, is not more than the maximum length of the object ID, the original object ID 1305 can be written into the third field as the post-conversion original object ID 1304. Conversely, for example, when the data length of the object ID is a fixed length, and this fixed length is exceeded by adding the object ID type 1301 and the share ID 1302, conversion processing is executed for either all or a portion of the original object ID 1305 based on the algorithm information 1002. In this case, for example, the post-conversion original object ID 1304 is converted so as to become shorter that the data length of the original object ID 1305 by deleting unnecessary data.

Next, the operation of the root node 200 will be explained. As described hereinabove, the root node 200 consolidates a plurality of share units to form a single pseudo file system, that is, the root node 200 provides the GNS to the client 100.

Figure 14:
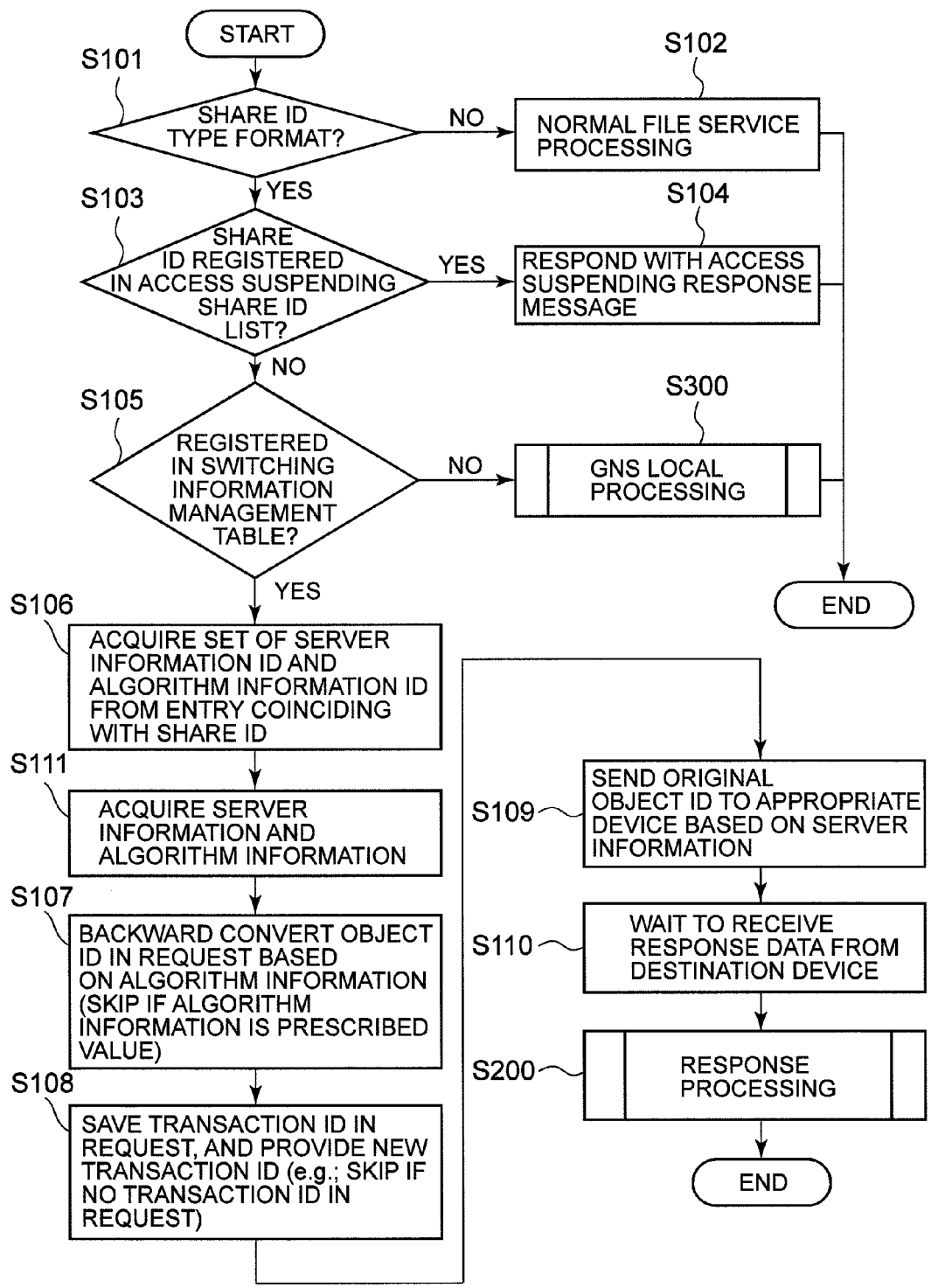
FIG. 14 is a flowchart of processing in which a root node provides a GNS.

FIG. 14 is a flowchart of processing in which the root node 200 provides the GNS.

First, the client communications module 606 receives from the client 100 request data comprising an access request for an object. The request data comprises an object ID for identifying the access-targeted object. The client communications module 606 notifies the received request data to the file access management module 700. The object access request, for example, is carried out using a remote procedure call (RPC) of the NFS protocol. The file access management module 700, which receives the request data notification, extracts the object ID from the request data. Then, the file access management module 700 references the object ID type 1301 of the object ID, and determines whether or not the format of this object ID is share ID type format (S101).

When the object ID type is not share ID type format (S101: NO), conventional file service processing is executed (S102), and thereafter, processing is ended.

When the object ID type is share ID type format (S101: YES), the file access management module 700 acquires the share ID 1302 contained in the extracted object ID. Then, the file access management module 700 determines whether or not there is a share ID that coincides with the acquired share ID 1302 among the share IDs registered in the access suspending share ID list 704 (S103).

When the acquired share ID 1302 coincides with a share ID registered in the access suspending share ID list 704 (S103: YES), the file access management module 700 sends to the client 100 via the client communications module 606 response data to the extent that access to the object corresponding to the object ID contained in the request data is suspended (S104), and thereafter, processing ends.

When the acquired share ID 1302 does not coincide with a share ID registered in the access suspending share ID list 704 (S103: NO), the file access management module 700 determines whether or not there is an entry comprising a share ID 801 that coincides with the acquired share ID 1302 in the switching information management table 800 (S105). As explained hereinabove, there could be a plurality of share ID 801 entries here that coincide with the acquired share ID 1302.

When there is no matching entry (S105: NO), a determination is made that this root node 200 should process the received request data, the file system program 203 is executed, and GNS local processing is executed (S300). GNS local processing will be explained in detail hereinbelow.

When there is a matching entry (S105: YES), a determination is made that a device other than this root node 200 should process the received request data, and a group of one set of a server information ID 802 and algorithm information ID 803 is acquired from the coinciding share ID 801 entry (S106). When there is a plurality of coinciding entries, for example, one entry is selected either in round-robin fashion, or on the basis of a previously calculated response time, and a server information ID 802 and algorithm information ID 803 are acquired from this selected entry.

Next, the file access management module 700 references the server information management table 900, and acquires server information 902 corresponding to a server information ID 901 that coincides with the acquired server information ID 802. Similarly, the file access management module 700 references the algorithm information management table 1000, and acquires algorithm information 1002 corresponding to an algorithm information ID 1001 that coincides with the acquired algorithm information ID 803 (S111).

Thereafter, if the algorithm information 1002 is not a prescribed value (for example, a value of 0), the file access management module 700 indicates that the object ID conversion processing module 604 carry out a backward conversion based on the acquired algorithm information 1002 (S107), and conversely, if the algorithm information 1002 is a prescribed value, the file access management module 700 skips this S107. In this embodiment, the fact that the algorithm information 1002 is a prescribed value signifies that request data is transferred to another root node 200. That is, in the transfer between root nodes 200, the request data is simply transferred without having any conversion processing executed. That is, the algorithm information 1002 is information signifying an algorithm that does not make any conversion at all (that is, the above prescribed value), or information showing an algorithm that only adds or deletes an object ID type 1301 and share ID 1302, or information showing an algorithm, which either adds or deletes an object ID type 1301 and share ID 1302, and, furthermore, which restores the original object ID 1303 from the post-conversion original object ID 1304.

Next, when the protocol is for executing transaction processing at the file access request level, and the request data comprises a transaction ID, the file access management module 700 saves this transaction ID, and provides the transaction ID to either the root node 200 or the leaf node 300, which is the request data transfer destination device (S108). Either transfer destination node 200 or 300 can reference the server information management table 900, and can identify server information from the server information 902 corresponding to the server information ID 901 of the acquired group. Furthermore, if the above condition is not met (for example, when a transaction ID is not contained in the request data), the file access management module 700 can skip this S108.

Next, the file access management module 700 sends via the root/leaf node communications module 605 to either node 200 or 300, which was specified based on the server information 902 acquired in S111, the received request data itself, or request data comprising the original object ID 1305 (S109). Thereafter, the root/leaf node communications module 605 waits to receive response data from the destination device (S110).

Upon receiving the response data, the root/leaf node communications module 605 executes response processing (S200). Response processing will be explained in detail using FIG. 15.

Figure 15:
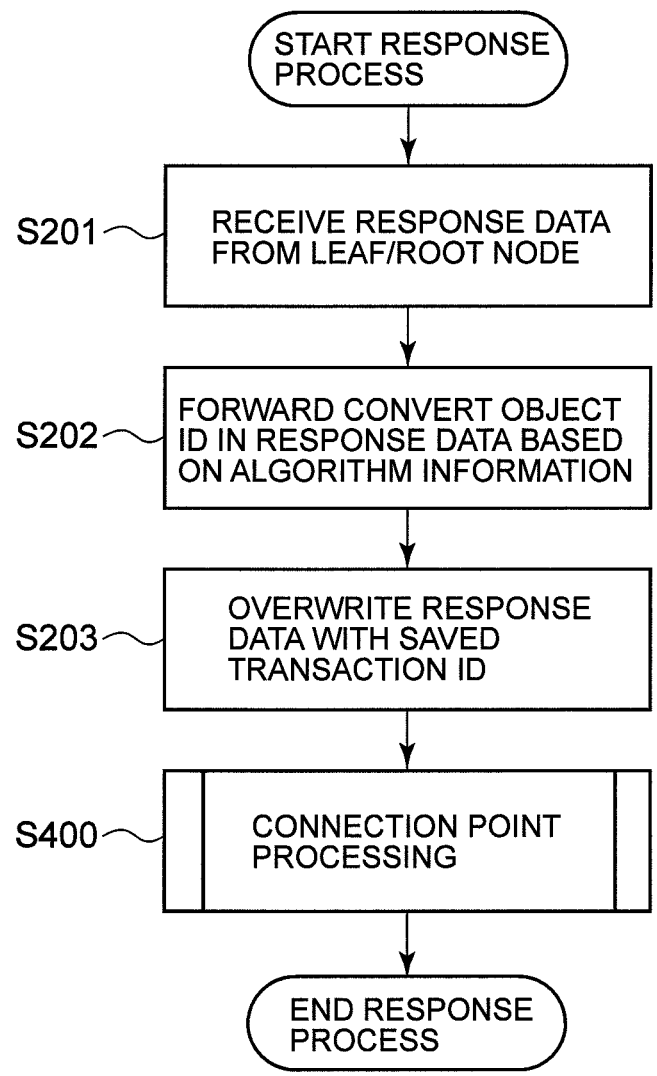
FIG. 15 is a flowchart of processing (response processing) when a root node receives response data.

FIG. 15 is a flowchart of processing (response processing) when the root node 200 receives response data.

The root/leaf node communications module 605 receives response data from either the leaf node 300 or from another root node 200 (S201). The root/leaf node communications module 605 notifies the received response data to the file access management module 700.

When there is an object ID in the response data, the file access management module 700 indicates that the object ID conversion processing module 604 convert the object ID contained in the response data. The object ID conversion processing module 604, which receives the indication, carries out forward conversion on the object ID based on the algorithm information 1002 referenced in S107 (S202). If this algorithm information 1002 is a prescribed value, this S202 is skipped.

When the protocol is for carrying out transaction management at the file access request level, and the response data comprises a transaction ID, the file access management module 700 overwrites the response message with the transaction ID saved in S108 (S203). Furthermore, when the above condition is not met (for example, when a transaction ID is not contained in the response data), this S203 can be skipped.

Thereafter, the file access management module 700 executes connection point processing, which is processing for an access that extends across share units (S400). Connection point processing will be explained in detail below.

Thereafter, the file access management module 700 sends the response data to the client 100 via the client communications module 606, and ends response processing.

Figure 16:
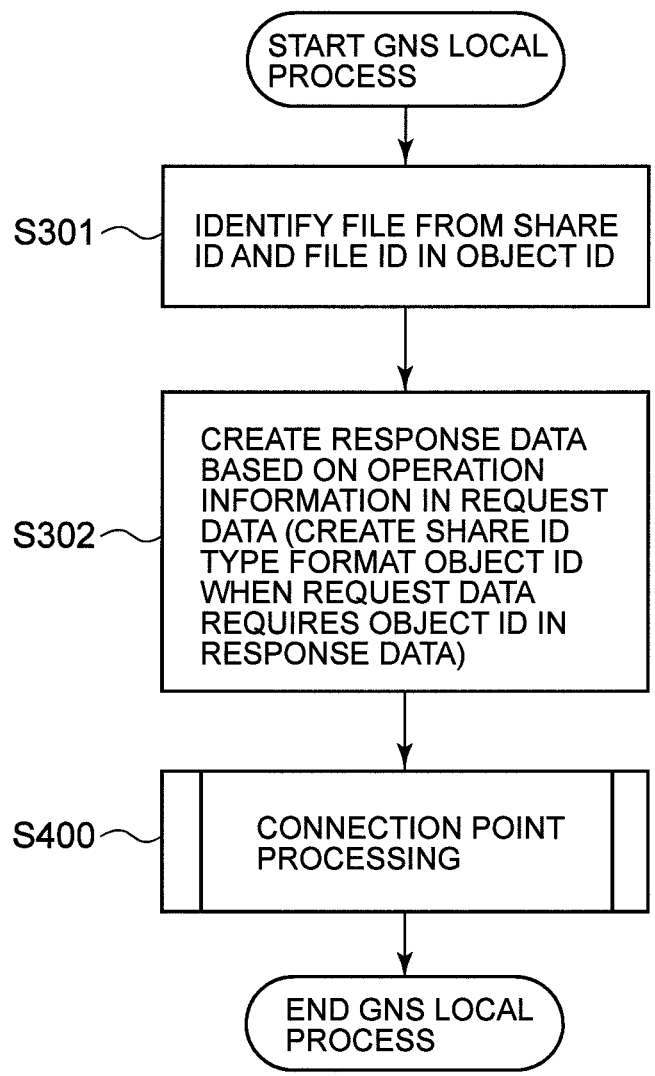
FIG. 16 is a flowchart of GNS local processing executed by a root node.

FIG. 16 is a flowchart of GNS local processing carried out by the root node 200.

First, an access-targeted object is identified from the share ID 1302 and original object ID 1303 in an object ID extracted from request data (S301).

Next, response data is created based on information, which is contained in the request data, and which denotes an operation for an object (for example, a file write or read) (S302). When it is necessary to include the object ID in the response data, the same format as the received format is utilized in the format of this object ID.

Thereafter, connection point processing is carried out by the file access management module 700 of the switching program 600 (S400).

Thereafter, the response data is sent to the client 100.

Figure 17:
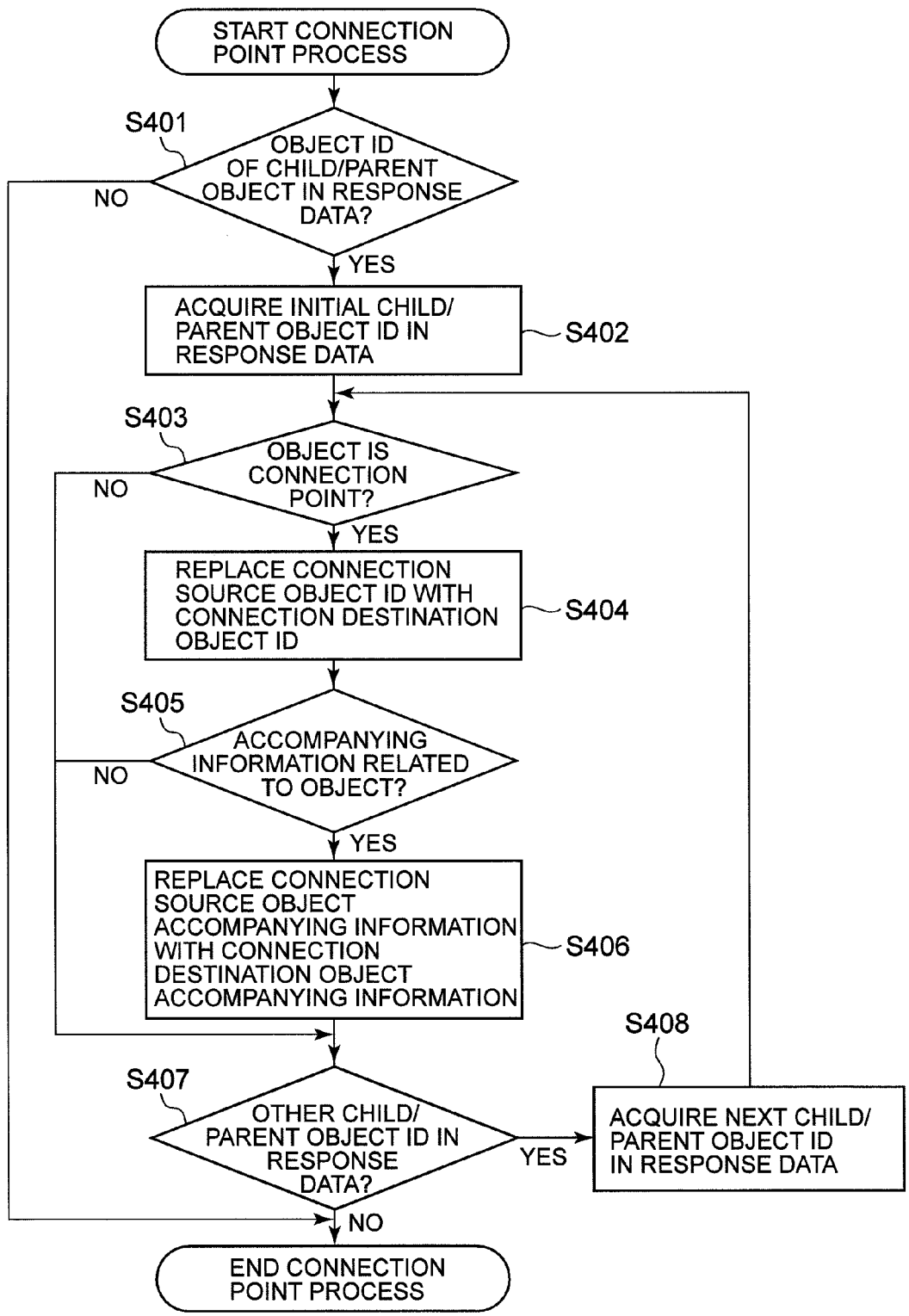
FIG. 17 is a flowchart of connection point processing executed by a root node.

FIG. 17 is a flowchart of connection point processing carried out by the root node 200.

First, the file access management module 700 checks the access-targeted object specified by the object access request (request data), and ascertains whether or not the response data comprises one or more object IDs of either a child object (a lower-level object of the access-targeted object in the directory tree) or a parent object (a higher-level object of the access-targeted object in the directory tree) of this object (S401). Response data, which comprises an object ID of a child object or parent object like this, for example, corresponds to response data of a LOOKUP procedure, READDIR procedure, or READDIRPLUS procedure under the NFS protocol. When the response data does not comprise an object ID of either a child object or a parent object (S401: NO), processing is ended.

When the response data comprises one or more object IDs of either a child object or a parent object (S401: YES), the file access management module 700 selects the object ID of either one child object or one parent object in the response data (S402).

Then, the file access management module 700 references the connection point management table 1100, and determines if the object of the selected object ID is a connection point (S403). More specifically, the file access management module 700 determines whether or not the connection source object ID 1101 of this entry, of the entries registered in the connection point management table 1100, coincides with the selected object ID.

If there is no coinciding entry (S403: NO), the file access management module 700 ascertains whether or not the response data comprises an object ID of another child object or parent object, which has yet to be selected (S407). If the response data does not comprise the object ID of any other child object or parent object (S407: NO), connection point processing is ended. If the response data does comprise the object ID of either another child object or parent object (S407: YES), the object ID of one as-yet-unselected either child object or parent object is selected (S408). Then, processing is carried out once again from S403.

If there is a coinciding entry (S403: YES), the object ID in this response data is substituted for the connection destination object ID 1103 corresponding to the connection source object ID 1101 that coincides therewith (S404).

Next, the file access management module 700 determines whether or not there is accompanying information related to the object of the selected object ID (S405). Accompanying information, for example, is information showing an attribute related to this object. When there is no accompanying information (S405: NO), processing moves to S407. When there is accompanying information (S405: YES), the accompanying information of the connection source object is replaced with the accompanying information of the connection destination object (S406), and processing moves to S407.

According to the first embodiment described hereinabove, an identifier, which identifies a file service public item called a share ID, is inserted into an object ID exchanged by the client 100 and the root node 200. When creating an object ID, all root nodes 200 and a portion of the leaf nodes 300 create the object ID ahead of time in a form, which comprises a share ID. The client 100 uses a object ID having share ID type format to carry out object operation indications to either the root node 200 or the leaf node 300. The root node 200, which receives the request data comprising the object ID from the client 100, references the switching information management table 800 in which a share ID is associated with a server information ID (identifiers of information related to either the root node 200 or the leaf node 300 constituting the transfer destination), and if the transfer destination specified by using the share ID in this object ID is a root node 200, transfers this request data as-is without performing special processing on this request data in most cases.

That is, the root node 200 that receives the request data is not required to convert the object ID when the transfer destination of this request data is another root node 200. Thus, the processing load of the root node 200 that receives request data is lightened.

Further, the table, which the root node 200 references when deciding a transfer destination, only has a number of entries corresponding to the number of share units. Since a share unit is generally an aggregate of a plurality of objects, the size of the table is small compared to a table that has file item entries. Therefore, it is possible to lessen the processing load of the root node 200 that receives the request data.

<Second Embodiment>

A second embodiment of the present invention will be explained hereinbelow. In so doing, explanations of the points in common with the first embodiment will be omitted or simplified, and the explanation will focus mainly on the points of difference with the first embodiment.

A root node 200 of the second embodiment has root node setting functions for carrying out file sharing services in which the plurality of share units shown in the first embodiment are consolidated and virtualized into a single share unit (that is, a service that provides GNS).

A processing procedure for consolidating share units, which is started by a prescribed indication being inputted by an administrator to a setting source device (for example, a management computer) having an administrator user interface (hereinafter, management UI) (other triggers can also be used), will be explained in detail below.

Figure 18:
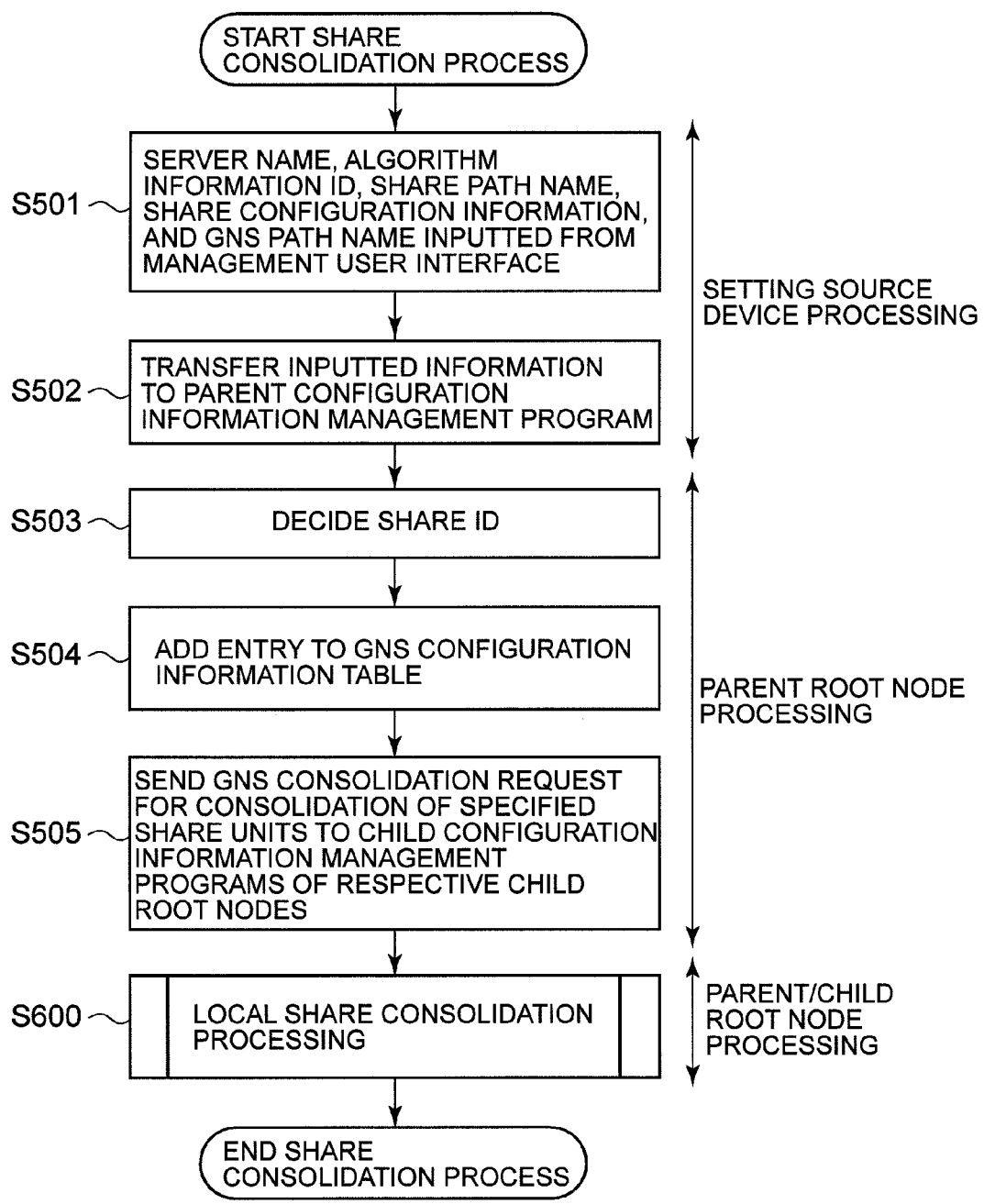
FIG. 18 is a flowchart of GNS setup processing executed by a root node of a second embodiment of the present invention.

FIG. 18 is a flowchart of a GNS setting process.

First, the name of a server, which possesses the consolidation-targeted share units, an algorithm information ID, the name of a share path to these share units (for example, the name of a path to the top directory of these share units), share configuration information corresponding to these share units, and a GNS path name are inputted by an administrator into the administrator user interface (for example, a graphical user interface (GUI)) of the setting source device (S501). GNS path name here is the name of a path to an object name from the root directory in the GNS. This inputted information is transferred from the setting source device to the parent configuration information management program 400p running on the parent root node 200p (S502).

The parent configuration information management program 400p, which receives the transfer of the above-mentioned information, references the free share ID management list 402, and decides a share ID that is unique to this computer system for identifying the above-mentioned consolidation-targeted share units (S503).

Then, the parent configuration information management program 400p creates a GNS configuration information table 1200p entry, which comprises the information received from the setting source device and the acquired share ID, and registers this entry in the GNS configuration information table 1200p (S504).

Next, the parent configuration information management program 400p notifies the registered entry to the child configuration information programs 400c running on all the child root nodes 200, and also indicates the commencement of local share consolidation processing, which constructs the GNS (S505).

Thereafter, the configuration information management programs 400 of all the root nodes 200 (parent and child root nodes) implement local share consolidation processing (S600), and processing is ended.

Figure 19:
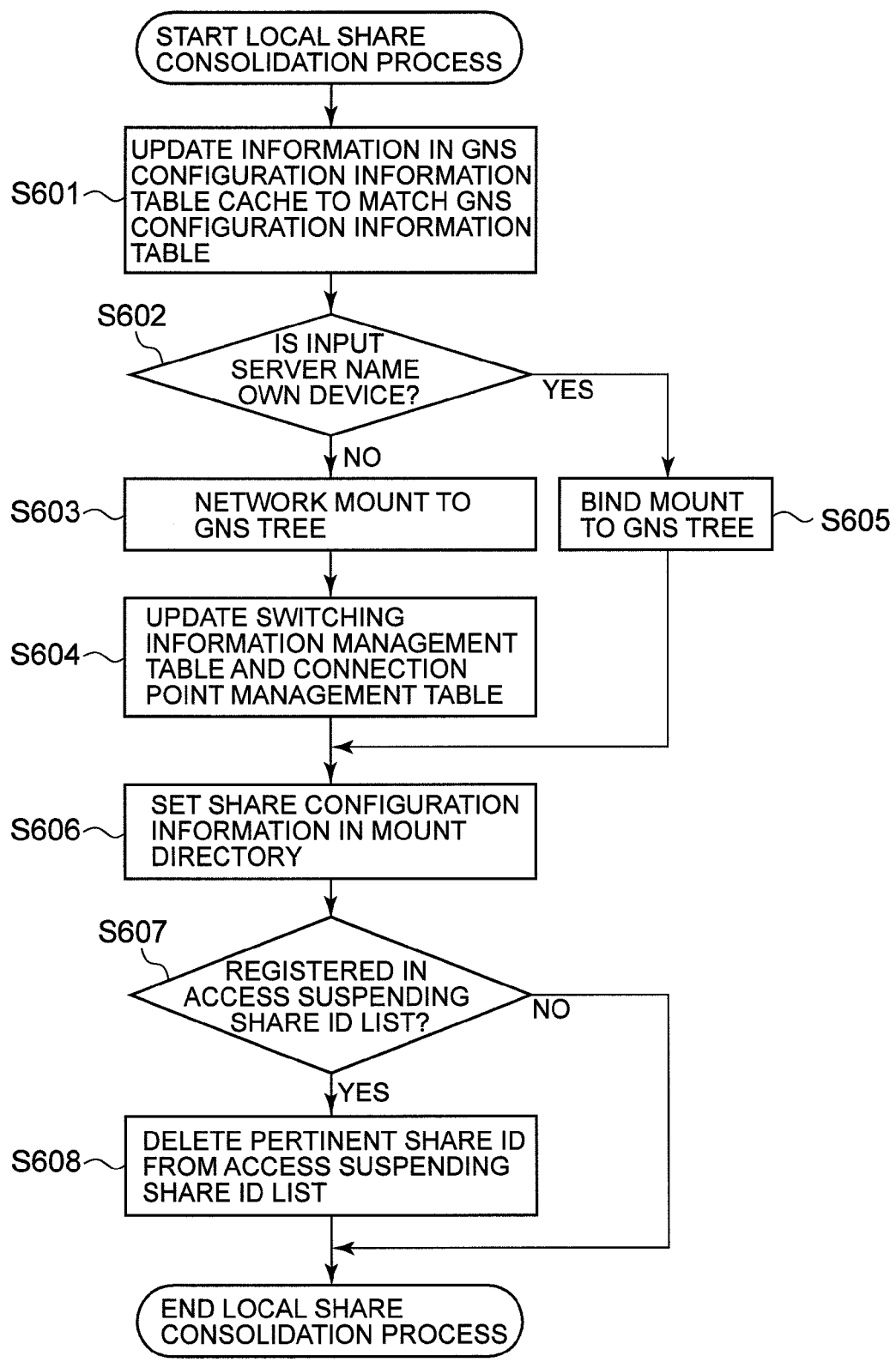
FIG. 19 is a flowchart of local share consolidation processing.

FIG. 19 is a flowchart of local share consolidation processing.

First, when the root node 200 that implements this processing is a child root node 200c, the child configuration information management program 400c registers a notified entry in the GNS configuration information table cache 1200c (S601). When the root node 200 that implements this processing is a parent root node 200p, S601 is skipped.

The configuration information management program 400 determines whether or not the registered entry server name 1203 is the name of its own device (the name of the root node 200 which is executing this configuration information management program 400) (S602).

When the server name 1203 is the name of its own device (S602: YES), the configuration information management program 400 executes a bind mount (S605), and proceeds to S606. A bind mount is the mounting of the top directory of a share unit, which is specified from the share path name 1204 in the registered entry, and which is either all or a portion of the device's own local file system, to a directory specified from the GNS path name 1202.

When the server name 1203 is not the name of its own device (S602: NO), the configuration information management program 400 executes a network mount (S603). A network mount is the mounting of the top directory of a share unit, which is specified from the share path name 1204 in the registered entry, and which is either all or a portion of the other local file system, to a directory specified from the GNS path name 1202.

After S603, the configuration information management program 400 updates the switching information management table 800 and connection point management table 1100 based on the registered entries (S604). For example, a share ID 801 that coincides with the share ID 1201 in the registered entry, a server information ID 802 corresponding to the server name 1203, and an algorithm information ID 803 that coincides with the algorithm information ID 1206 are added to the switching information management table 800. Further, for example, a connection destination share ID 1102 coinciding with the share ID 1201 in the registered entry is registered in the connection point management table 1100.

Thereafter, the configuration information management program 400 sets the share configuration information 1205 in the mount directory (S606). For example, the configuration information management program 400 sets the share configuration information 1205 in "/gnsroot/leaf1_share", which is the mount directory, when the share "leaf1:/share" is mounted in "root1:/gnsroot/leaf1_share".

Next, the configuration information management program 400 determines whether or not a share ID coinciding with the notified entry share ID 1201 is registered in the access suspending share ID list 704 (S607). If a coinciding share ID is not registered (S607: NO), processing is ended. If a coinciding share ID is registered (S607: YES), the configuration information management program 400 deletes the coinciding share ID from the access suspending share ID list 704 (S608), and ends processing.

According to the second embodiment described hereinabove, the plurality of root nodes 200 comprising this system can share configuration information related to the GNS. That is, a plurality of root nodes 200 can provide the same GNS to the client 100. Therefore, providing a plurality of root nodes 200 makes it possible to distribute the load of the respective root node 200, enabling the processing load of the root node 200 to be lessened.

Furthermore, in this second embodiment, using S503 as a trigger, the parent root node 200p can suspend (not process) an access request from the client 100. Further, for example, either the setting source device or the parent root node 200p can cause a computer program, which is executed on the client 100, and which issues an access request, to stop (state in which an access request is not issued), and thereafter, S501 is carried out, a response is made at the end of S608, and either the setting source device or the parent root node 200p can cancel this stoppage. Further, the share ID determined in S503, and the share ID in the entry notified in S601 are registered in the access suspending share ID list 704, and can be deleted in S608.

<Third Embodiment>

A third embodiment of the present invention will be explained hereinbelow. In so doing, explanations of the points in common with the first and second embodiments will be omitted or simplified, and the explanation will focus mainly on the points of difference with the first and second embodiments.

A root node 1900 of the third embodiment can implement file system migration or replication while file sharing services are being carried out without changing the configuration of the GNS.

Figure 20:
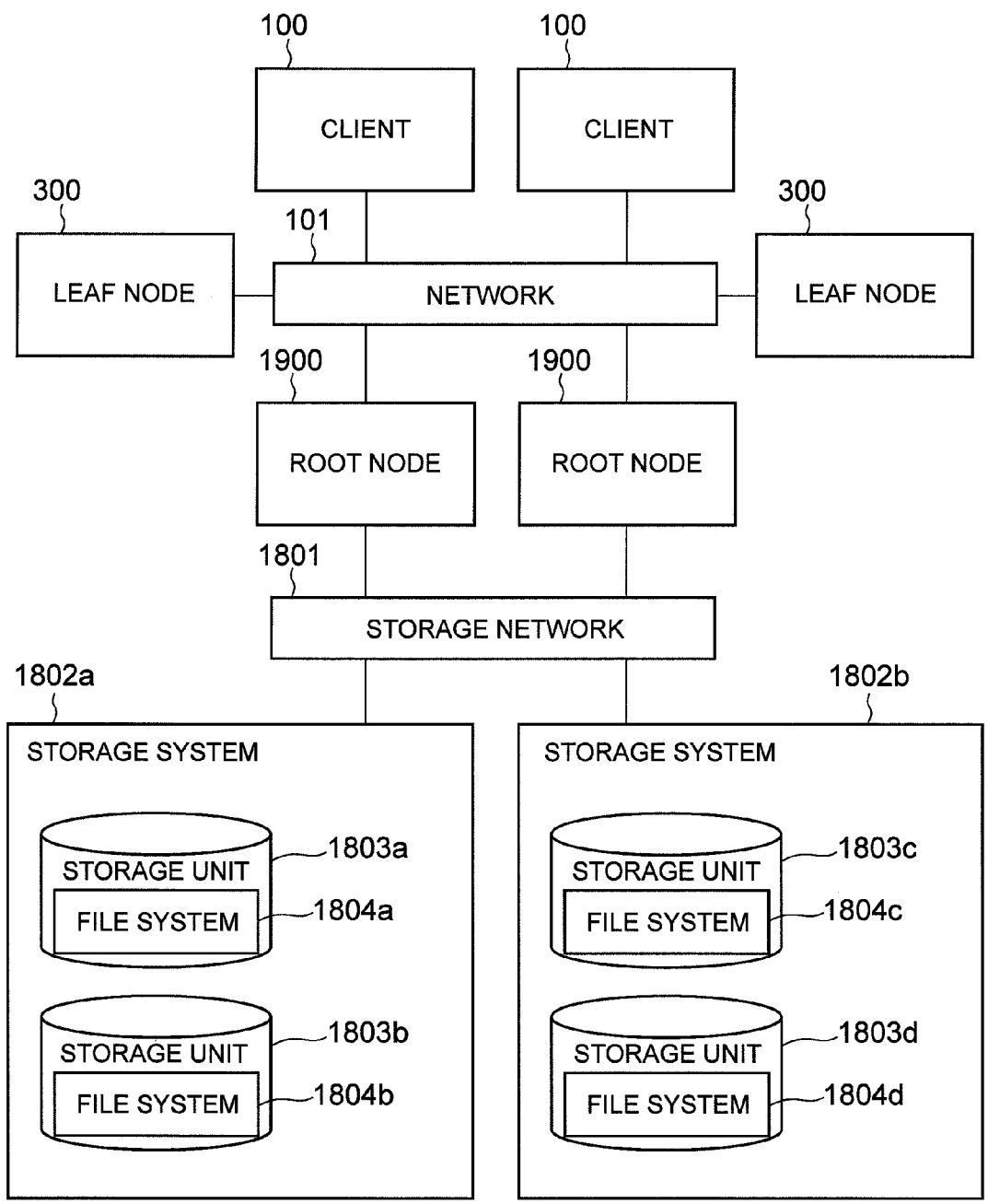
FIG. 20 is a diagram showing an example of the constitution of a computer system comprising a root node related to a third embodiment of the present invention.

FIG. 20 is a diagram showing an example of the constitution of a computer system comprising a root node related to the third embodiment of the present invention.

A plurality of root nodes 1900 and a plurality of storage systems 1802a, 1802b are connected in a storage network (for example, a SAN (Storage Area Network)) 1801 (a leaf node 300 can be connected to a storage system instead of a root node 1900.).

Since the storage systems 1802a, 1802b can use the same configuration, storage system 1802a will be taken up and explained as a typical example. Storage system 1802a, for example, comprises a plurality of physical storage units. A RAID (Redundant Array of Independent (or Inexpensive) Disks) is configured from these plurality of physical storage units, and a plurality of logical storage units 1803a, 1803b are created on the basis of this plurality of physical storage units.

The root node 1900 can access storage units 1803a and 1803b of storage system 1802a, and can also access storage units 1803c and 1803d of storage system 1802b by way of the storage network 1801.

Figure 21:
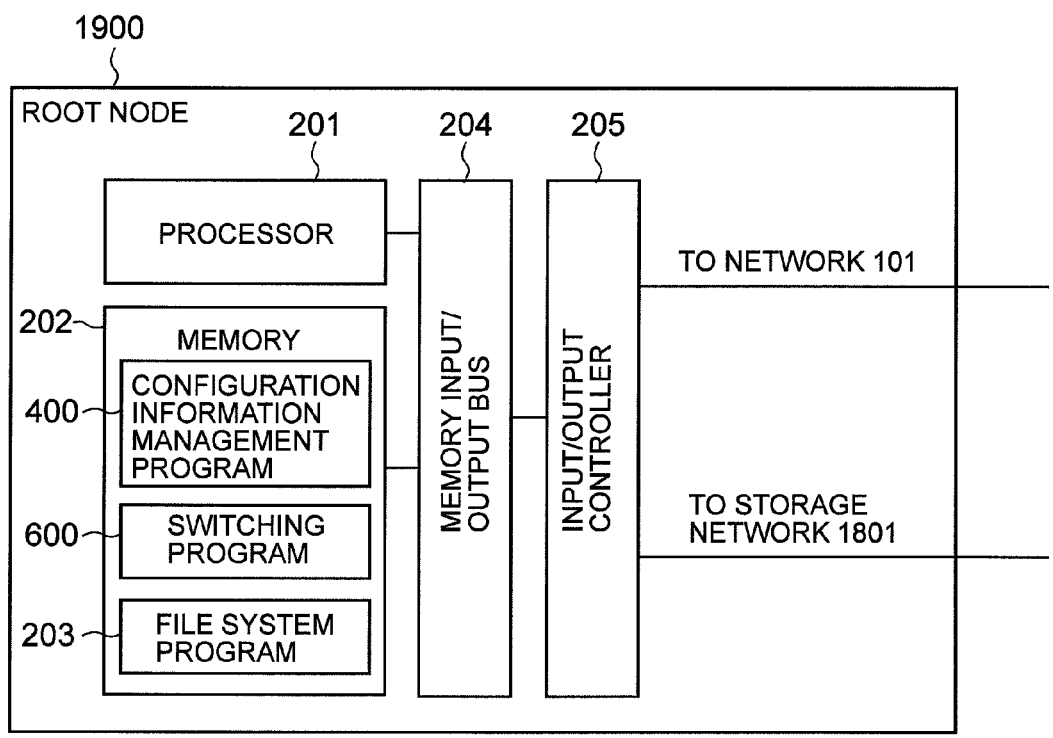
FIG. 21 is a block diagram showing an example of the constitution of a root node of the third embodiment.

FIG. 21 is a block diagram showing an example of the constitution of the root node 1900 in the third embodiment.

The constitution of the root node 1900 is basically the same as that of the first embodiment, but the fact that the root node 1900 is connected to a storage network 1801 from the input/output controller 205 differs. That is, the root node 1900 of this embodiment can access the storage units 1803a, 1803b, 1803c, 1803d contained in the storage networks 1801a, 1801b. Further, the root node 1900 can comprise a storage unit 206 and a file system 207 in the device the same as in the first embodiment.

Figure 22:
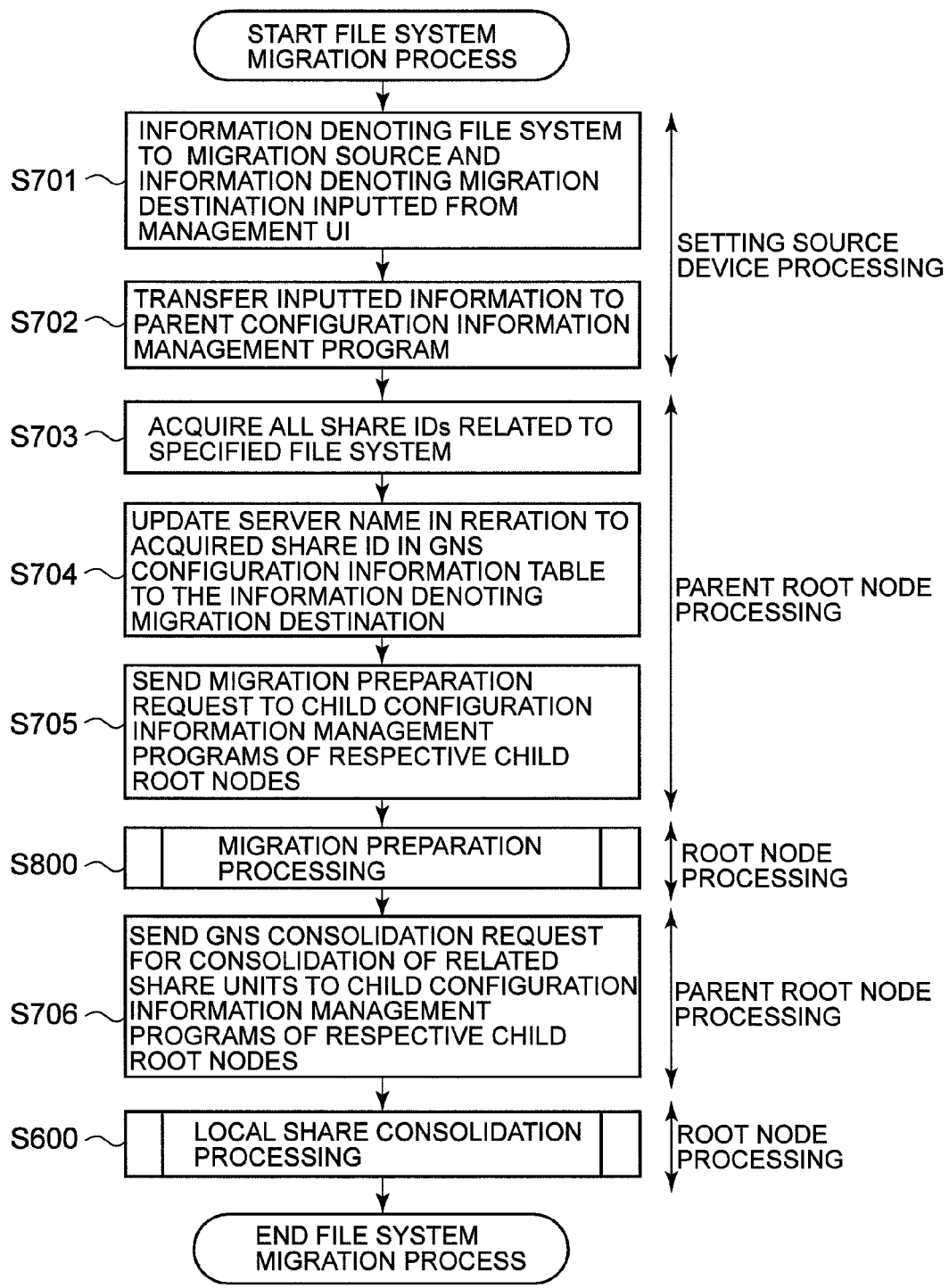
FIG. 22 is a flowchart of file system migration processing.

FIG. 22 is a flowchart of file system migration processing carried out by the root node 1900. Furthermore, in the following explanation, it is supposed that the file system targeted for migration is "file system 1804a". Prior to migration, file system 1804a is mounted to a first child root node 1900c, and this file system 1804a is migrated to a second child root node 1900c.

First, information related to the file system 1804a targeted for migration, and information related to the second child root node 1900c, the migration destination, is inputted to the management UI (S701). Hereinafter, it is supposed that a file system ID, which is an identifier for identifying file system 1804a, is inputted as the information related to file system 1804a, and that a server name is inputted as the information related to the second child root node 1900c.

These inputted file system ID and server name are transferred to the parent configuration information management program 400p from the setting source device (S702).

The parent configuration information management program 400p, which receives the file system ID and server name, acquires all share IDs associated to this file system ID (S703). For example, the ID of a file system comprising a share unit identified from corresponding share ID 1201 is contained in the share configuration information 1205 in the GNS configuration information table 1200p, and therefore, if this GNS configuration information table 1200p is referenced, all the share IDs corresponding to the received file system ID can be acquired. Hereinafter, it is supposed that the acquisition of a share ID corresponding to a file system ID can be accomplished by referencing the GNS configuration information table 1200p (or the GNS configuration information table cache 1200c).

Then, the parent configuration information management program 400p changes the server name 1203 corresponding to the acquired share ID 1201 to the transferred server name in the GNS configuration information table 1200p (S704).

Next, the parent configuration information management program 400p notifies the transferred file system ID and server name, and the above-mentioned acquired share ID 1201, and indicates the start of migration preparation processing to the child configuration information management programs 400c running on all the child root nodes 1900c (S705).

Thereafter, the configuration information management programs 400 of all the root nodes 1900 (comprising both parent root nodes and child root nodes) carry out migration preparation processing (S800). Migration preparation processing will be explained in detail hereinbelow.

After confirming that migration preparation processing has ended in all the root nodes 1900, the parent configuration information management program 400p of the parent root node 1900 notifies a changed entry and indicates the start of the above-described local share consolidation processing to the child configuration information management programs 400c of all the child root nodes 1900 (S706).

Thereafter, the configuration information management programs 400 of all the root nodes 1900 (comprising both parent root nodes and child root nodes) implement local share consolidation processing (refer to FIG. 19) (S600), and end file system migration processing.

Figure 23:
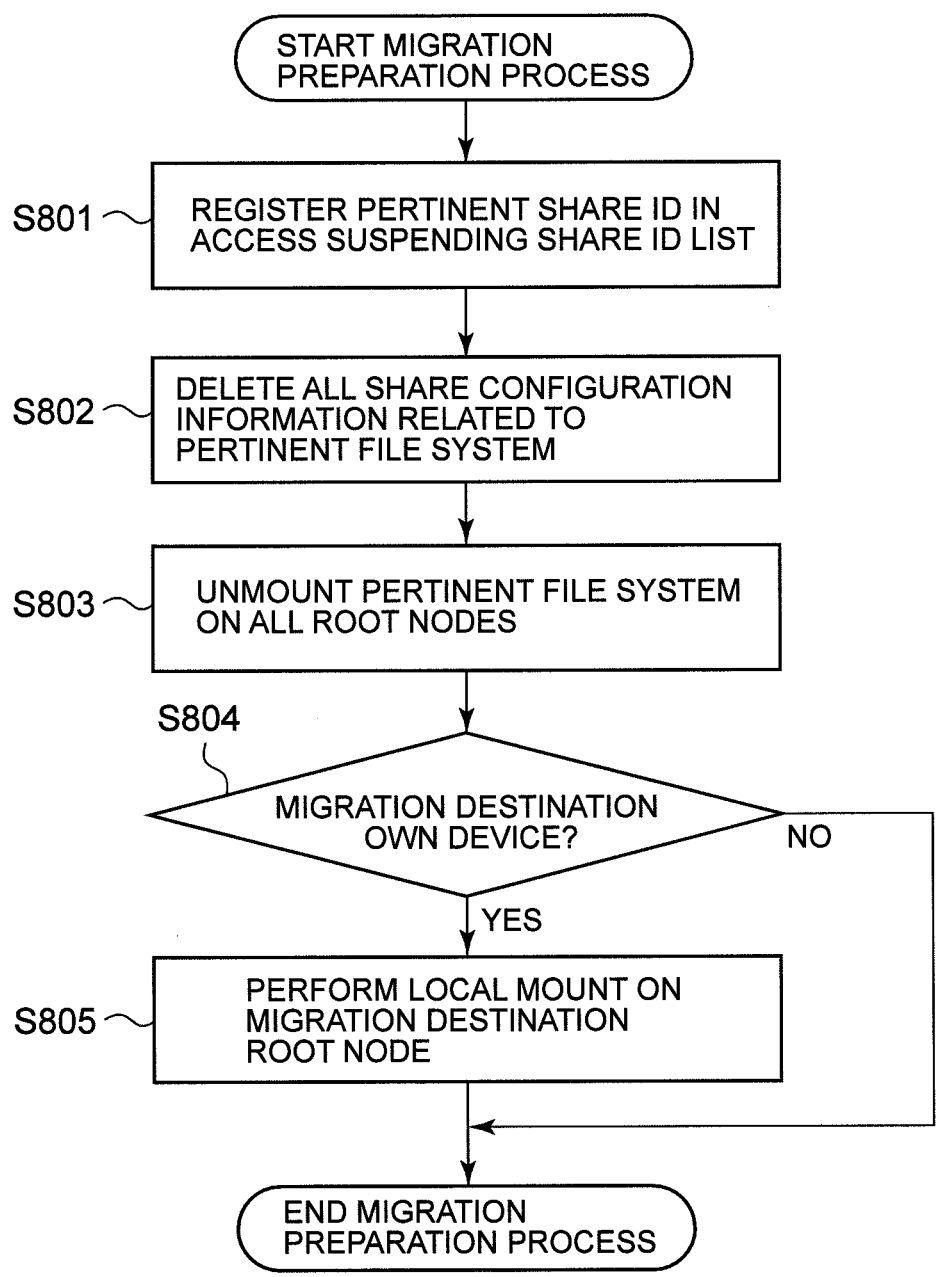
FIG. 23 is a flowchart of migration preparation processing.

FIG. 23 is a flowchart of migration preparation processing.

First, the configuration information management program 400 registers the notified share ID 1201 in the access suspending share ID list 704 (S801).

Next, the configuration information management program 400 deletes all share configuration information 1205 corresponding to the notified share ID 1201 (S802).

Then, the configuration information management program 400 unmounts the file system specified by the notified file system ID in all root nodes (S803). At this point, the child configuration information management program 400c of the first child root node 1900c unmounts the specified file system 1804a. These can comprise unmounts of network mounts, bind mounts, and local mounts. Furthermore, a local mount is the mounting of the device's own local file system in file system units, which have not been consolidated in the GNS.

Next, the configuration information management program 400 determines whether or not the notified server name designates its own device (S804). When the migration destination is its own device (S804: YES), the file system 1804a unmounted in S803 is subjected to a local mount (S805), and migration preparation processing ends. That is, the child configuration information management program 400c of the second child root node 1900c mounts the file system 1804a. Conversely, when the migration destination is not its own device (S804: NO), the configuration information management program 400 ends migration preparation processing without doing anything.

According to the above example, file system 1804a, which is mounted to the first child root node 1900c via the storage network 1801, is removed from the first child root node 1900c, and file system 1804a is mounted in the second root node 1900c via the storage network 1801, thereby completing file system migration. By so doing, since the server names corresponding to the respective share IDs 1201 comprising this file system 1804*a* are changed to server names of the second root node 1900*c* from server names of the first root node 1900*c*, and as a result of these changes, the parent configuration information management program 400*p* can conceal the migration-based change of configuration from a client 100 by sending the entry information comprising these post-change server names to all root nodes 1900, and carrying out a GNS consolidation request. Furthermore, the respective root nodes 1900 can receive request data even during a migration. If a share ID of a share unit related to a migration target file system is specified, since this share ID is registered in the access suspending share ID list, the processing of access data is suspended during a migration.

Figure 24:
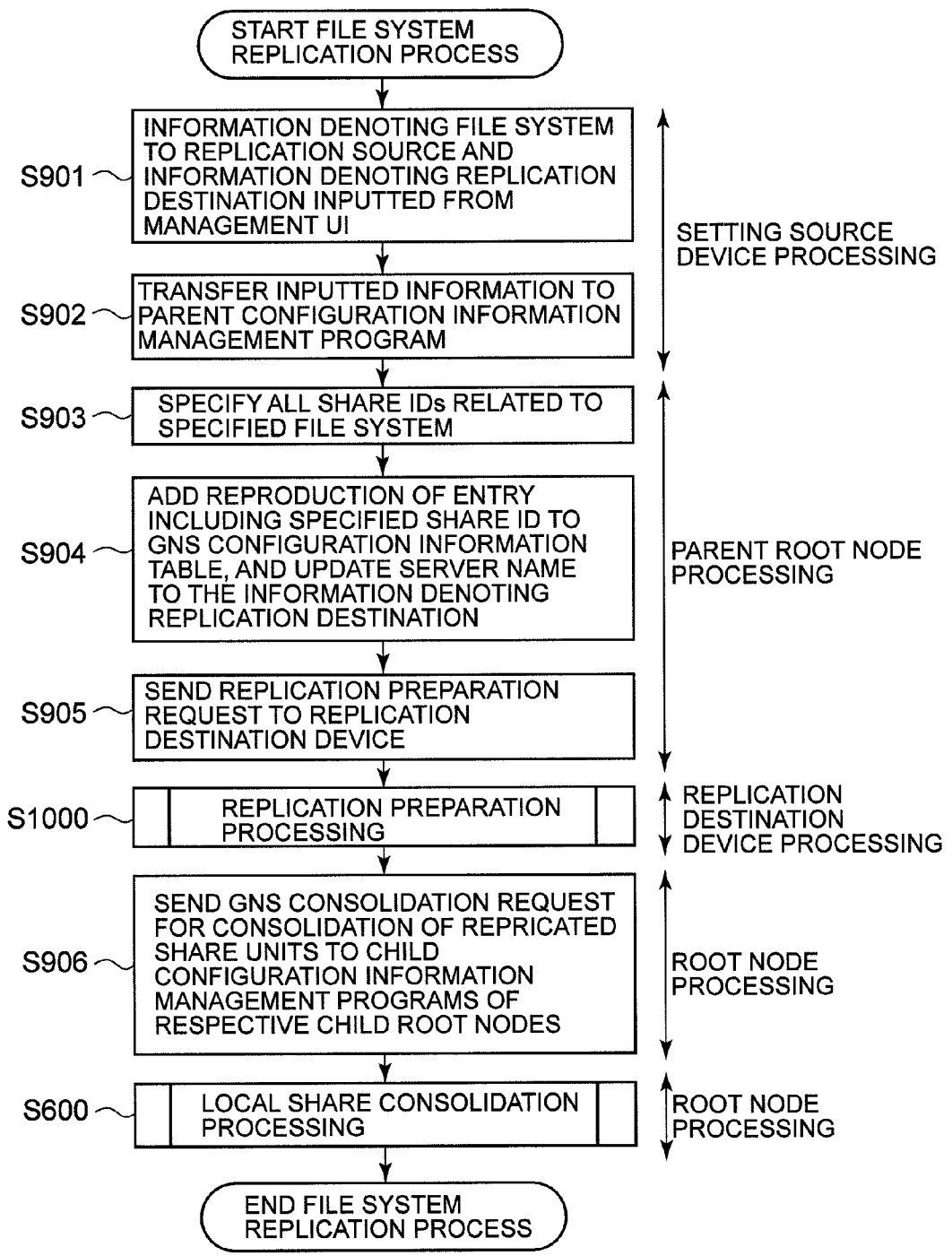
FIG. 24 is a flowchart of file system replication processing.

FIG. 24 is a flowchart of file system migration processing carried out by a root node 1900. Furthermore, in the following explanation, it is supposed that a file system 1804*a*, which is mounted to the first child root node 1900*c*, is replicated to the second child root node 1900*c*.

First, information related to the file system 1804*a* targeted for replication, and information related to the second child root node 1900*c*, the replication destination, is inputted to the management UI (S901). Hereinafter, it is supposed that a file system ID, which is an identifier for identifying file system 1804*a*, is inputted as the information related to file system 1804*a*, and that a server name is inputted as the information related to the second child root node 1900*c*.

These inputted file system ID and server name are transferred to the parent configuration information management program 400*p* from the setting source device (S902).

The parent configuration information management program 400*p*, which receives the file system ID and server name, specifies all share IDs associated to this file system ID (S903).

Then, the parent configuration information management program 400*p* creates a reproduction of the entry comprising the specified share ID 1201, and changes the server name 1203 in the entry reproduction to the transferred server name (that is, the server name of the replication destination device) in the GNS configuration information table 1200*p* (S904).

Next, the parent configuration information management program 400*p* notifies the above-mentioned file system ID and server name, and the acquired share ID, and indicates the start of replication preparation processing to the child configuration information management program 400*c* running on the second child root node 1900*c*, which is the replication destination (S905). Furthermore, when the replication destination device is its own device, that is, when it is the parent root node 1900*p*, the indication in S905 is not carried out.

Thereafter, the child configuration information management program 400*c* of the second root node 1900*c*, which is the replication destination, executes replication preparation processing (S1000). Replication preparation processing will be explained in detail hereinbelow.

After confirming that replication preparation processing has ended, the parent configuration information management program 400*p* of the parent root node 1900*p* notifies the replicated entry and indicates the start of the above-described local share consolidation processing to the child configuration information management programs 400*c* of all the child root nodes 1900*c* (S906).

Thereafter, the configuration information management programs 400 of all the root nodes 1900 (comprising both parent root nodes and child root nodes) implement local share consolidation processing (refer to FIG. 19) (S600), and end file system replication processing.

Figure 25:
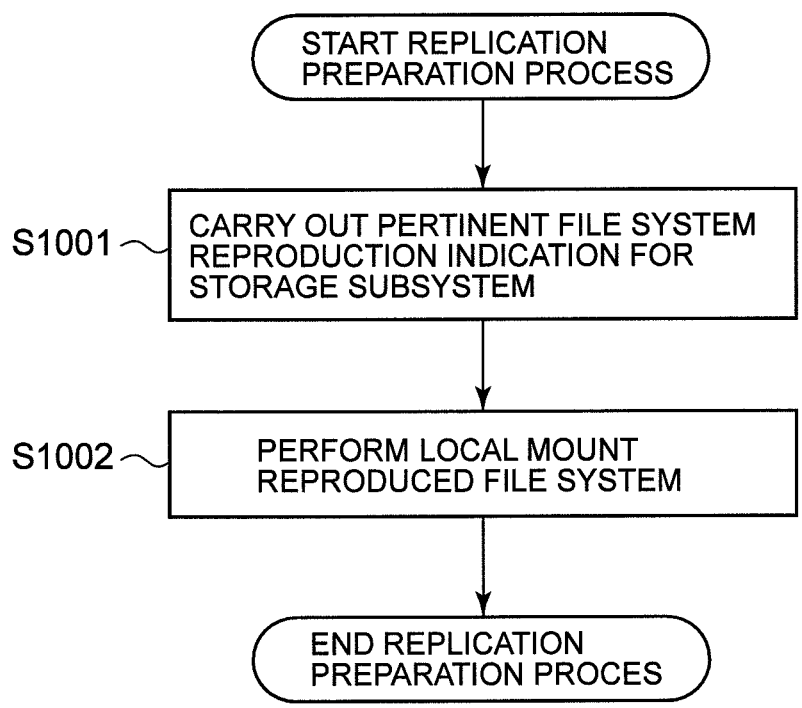
FIG. 25 is a flowchart of replication preparation processing.

FIG. 25 is a flowchart of replication preparation processing.

First, the configuration information management program 400 (the child configuration information management program 400*c* in the above example) indicates for the storage system 1802 to create a reproduction of the file system 1804*a* identified from the notified file system ID (S1101). More specifically, for example, the configuration information management program 400 indicates that the storage system 1802*a* having storage unit 1803*a* carry out a copy from this storage unit 1803*a*, which is storing the file system 1804*a*, to another storage unit. If the other storage unit is storage unit 1803*b*, a copy between storage units in the storage system 1802*a* (a so-called local copy) is carried out, and if the other storage unit is storage unit 1803*c* or 1803*d*, a remote copy is carried out from storage system 1802*a* to storage system 1802*b* via storage network 1801. Consequently, a reproduction of the file system 1804*a* is stored in the other storage unit.

Next, the configuration information management program 400 performs local mount the reproduction of the file system 1804*a* (S1002), and ends replication preparation processing.

In this third embodiment, the second child root node 1900*c* was used as the migration destination and the replication destination, but a leaf node 300 and the parent root node 1900*p* can also be used as migration destinations and replication destinations. In this case, the leaf node 300 also comprises the configuration information management program 400.

According to the above-described example, file system replication is completed by creating a reproduction of the file system 1804*a*, which is mounted in the first child root node 1900*c* by way of the storage network 1801, and mounting the reproduction of this file system 1804*a* in the second child root node 1900*c* via the storage network 1801. Since this increases the entries comprising the GNS configuration information table 1200*p*, as a result of this entry being added, the parent configuration information management program 400*p* can conceal a replication-based configuration change from the client 100 by sending this added entry information to all the root nodes 1900 and carrying out a GNS consolidation request.

Further, the share ID corresponding to the file system 1804*a* and the share ID corresponding to the reproduction of the file system 1804*a* are the same, the server names of both the first child root node 1900*c* and the second child root node 1900*c* are associated with this same share ID (hereinafter, target share ID) in the switching information management table 800 by the local share consolidation processing during replication. Thus, the root node 200 that receives request data selects either the first child root node 1900*c* or the second child root node 1900*c* as the transfer destination when the target share ID is contained in the object ID in this request data (This selection can be carried out using a prescribed rule, such as a round-robin format.). That is, the access destination is divided for share units that are logically the same. Consequently, this results in load distribution. Furthermore, share units that are logically the same means share units that exist in different locations but have the same content.

The preceding is an explanation of the third embodiment. Furthermore, in the above explanation, both migration and replication are in file system units, but migration and replication can also be carried out in share units instead of file system units. In this case, a share ID can be inputted to the management UI instead of a file system ID.

According to the third embodiment described hereinabove, in migration or replication processing, the corresponding relationship between the migration source and the migration destination, and the corresponding relationship between the replication source and the replication destination is managed in share units rather than file units. Thus, the increase in the processing load of the root node subsequent to carrying out a migration or a replication can be curbed.

A number of embodiments of the present invention are explained hereinabove, but these are merely examples for explaining the present invention, and do not purport to limit the scope of the present invention to these embodiments. The present invention can be put into practice in a variety of other forms. For example, at least one of a root node and a leaf node can be a NAS (Network Attached Storage) device.

What is claimed is:

1. A root node configured to be logically located between a client and a plurality of file servers that includes a file system, each including one or more objects, and carry out file level virtualization for logically providing a plurality of share units' that can be shared among file systems of the root node or other one or more root nodes, to the client, comprising:
 a memory configured to store transfer control information associated with share information that denotes each share unit, information of one or more devices that denotes one or more of the plurality of file servers and the other one or more root nodes managing a share unit of the share information, and one or more algorithm information that denotes how to convert an object ID corresponding to any of the file servers of the device information;
 a request data receiving module configured to receive request data which includes an object ID including the share information and denoting any of objects of a share unit of the share information;
 a request data processing module configured to reference transfer control information upon reception of the request data, and specify any one of the plurality of file servers and the other one or more root nodes, and an algorithm for converting the object ID from device information and algorithm information corresponding to the share information in the object ID of the request data;
 a converting module configured to convert the object ID included in the request data based on the specified algorithm; and
 a request data sending module configured to send the request data to the specified one of the plurality of file servers and the other one or more root nodes,
 wherein the request data processing module is configured to, when the plurality of device information and algorithm information corresponding to the share information exists in the transfer control information, select the device information and the algorithm information from the plurality of device information and algorithm information according to a predetermined method to specify any one of the plurality of file servers or the other root nodes and the algorithm for converting the object ID;
 wherein the request data sending module is configured to, when the specified algorithm is a predetermined value, send the received request data to the specified one of the plurality of file servers and the other root nodes, and
 wherein the request data sending module is configured to, when the specified algorithm is not a predetermined value, send request data in which the converting module converted the object ID to the specified one of the plurality of file servers.

2. A root node according to claim 1,
wherein the request data processing module is configured to, when the plurality of device information and algorithm information corresponding to the share information exists in the transfer control information, select one of the device information from among the plurality of device information based on response time measured in advance, and select the algorithm information corresponding to the selected one of the device information.

3. A root node according to claim 1,
wherein an object ID in the request data includes an object specific value for identifying an object in any one of the plurality of file servers and the other root nodes which manages a share unit corresponding to share information in this object ID,
the root node further comprising:
 a response data receiving module configured to receive response data including the object ID from any one of the plurality of file servers and the other root nodes in response to the transfer of the request data; and
 a response processing module configured to send the received response data to either the client or any one of the other root nodes,
 wherein the converting module is configured to, if the specified algorithm is not a predetermined value, remove share information from the object ID in accordance with a specified algorithm to convert the object ID,
 wherein the request data sending module is configured to send the request data including the post-conversion object ID to the specified one of the plurality of file servers,
 the converting module is configured to include the removed share information in the object ID included in the response data received from the file server that sent the request data, and converts the object ID, and
 wherein the response processing module is configured to send response data including the post-conversion object ID, to either the client or any one of the other root nodes.

4. A root node according to claim 3,
wherein the converting module is configured to, in addition to removing the share information from the object ID of the request data, execute first conversion processing for enlarging the size of the object specific value in this object ID from a first size to a second size,
wherein the request data sending module is configured to send the request data including the post-size expansion object specific value as an object ID, to the specified one of the plurality of file servers,
wherein the converting module is configured to execute second conversion processing for reducing the size of the object specific value included in the response data from the second size to the first size, and
wherein the response processing module is configured to send the response data which includes the object ID including an information group including the post-size reduction object specific value and the removed share information, to either the client or any one of the other root nodes.

5. A root node according to claim 1, further comprising:
a response data receiving module configured to receive response data including an object ID from any one of the plurality file servers and the other root nodes in response to the transfer of the request data; and
a response processing module configured to send the received response data to either the client or any one of the other root nodes,
wherein the response processing module is configured to reference connection management information, which denotes the corresponding relationship between a first object ID of a first object included in a first share unit, and a second object ID of a second object, which is included in a second share unit and which is virtually the same as the first object, determine whether or not the object ID in the received response data is included in the connection management information, and when this object ID is included in the connection management information, acquire another object ID corresponding to this object ID, and change the object ID included in the response data to the acquired other object ID.

6. A root node according to claim 1, further comprising:
an object management module configured to manage an object and provide file services for utilizing the object,
wherein, the request data processing module is configured to, when referencing the transfer control information according to the share information included in the object ID of the request data, and determining that an object corresponding to this object ID is managed by the object management module, require the object management module to execute an operation in accordance with the request data.

7. A root node according to claim 1, further comprising:
a share information registration module configured to register, in a storage area, share information corresponding to a share unit which is targeted for access suspension;
a suspension determination module configured to make a determination as to whether or not share information, which coincides with the share information in an object ID of the received request data, is registered in the storage area; and
a response processing module configured to, if the result of the determination is affirmative, create response data which denotes that it is not possible to access the object corresponding to the object ID, and send the response data to either the client or any one of the other root nodes.

8. A root node according to claim 7,
wherein the share information registration module is configured to register, in the storage area, share information corresponding to a share unit, which is specified as a migration target.

9. A root node according to claim 1, further comprising:
a namespace provision module configured to provide a virtual namespace to the client based on namespace definition information related to the configuration definition of the virtual namespace;
an update request receiving module configured to receive a request for an update of the namespace definition information;
a first update module configured to update the namespace definition information in accordance with this request;
a share information decision module configured to decide share information for a share unit related to the update of the namespace definition information;
a definition information synchronization module configured to send information related to the namespace definition information update, the decided share information, and a request for updating namespace definition information in one of the other root nodes, to any one of the other root nodes; and
a second update module configured to update the transfer control information to the transfer control information including the decided share information based on the namespace definition information update.

10. A root node according to claim 1, further comprising:
a namespace provision module configured to provide a virtual namespace to the client based on namespace definition information related to the configuration definition of the virtual namespace that integrated the plurality of share units;
an update request receiving module configured to receive information related to update of the namespace definition information, share information of a share unit related to update of the namespace definition information, and a request for updating namespace definition information;
a first update module configured to respond to a received request, and update the namespace definition information in accordance with the namespace definition information update request; and
a second update module configured to update the transfer control information to the transfer control information including the share information that received the transfer control information based on the namespace definition information update.

11. A root node according to claim 1, further comprising:
an unmount module configured to unmount a share unit corresponding to share information specified as a migration target.

12. A root node according to claim 11, further comprising:
a mount module configured to, when the file server or root node specified as a migration destination is itself, mount the migration target share unit which is in an unmounted state.

13. A root node according to claim 11, further comprising:
a namespace provision module configured to provide a virtual namespace to the client based on namespace definition information related to the configuration definition of the virtual namespace that integrated the plurality of share units;
a first update module configured to execute the namespace definition information update related to the unmounting and mounting of the migration target share unit; and
a second update module configured to, based on the namespace definition information update, update the transfer control information to transfer control information in which share information specified as the migration target is associated with device information corresponding to either a file server or a root node specified as the migration destination.

14. A root node according to claim 1, further comprising:
a namespace provision module configured to provide a virtual namespace to the client based on namespace definition information related to the configuration definition of the virtual namespace that integrated the plurality of share units;
a first update module configured to use the namespace definition information to associate information related to a replication target share unit with information related to either a file server or a root node specified as a replication destination;
a second update module configured to add, to the transfer control information, device information which is associated with share information specified as the replication target and which corresponds to either a file server or a root node specified as the replication destination, based on the namespace definition information update; and
a reproduction mount request module configured to send, to either a file server or root node specified as the replication destination, a request to mount a reproduction of the replication target share unit in either the file server or the root node.

15. A root node according to claim 1, further comprising:
a namespace provision module configured to provide a virtual namespace to the client based on namespace definition information related to the configuration definition of the virtual namespace that integrated the plurality of share units;
a first update module configured to use the namespace definition information to associate information related to a replication target share unit with information related to either a file server or a root node specified as the replication destination;
a second update module configured to add, to the transfer control information, device information which is associated with share information specified as the replication target and which corresponds to either a file server or a root node specified as the replication destination, based on the namespace definition information update;
a reproduction preparation module configured to prepare a reproduction of the replication target share unit; and
a mount module configured to, when the device is specified as the replication destination, mount the share unit reproduction in the device itself.

16. A root node according to claim 1, further comprising:
a response data receiving module configured to receive response data including an object ID from any one of the plurality file servers or the other root nodes in response to the transfer of the request data, and
a response processing module configured to, if share information is not included in an object ID of the received response data, acquire share information corresponding to device information which denotes any one of the plurality of file servers and the root nodes from the transfer control information, include the acquired share information in an object ID of the received response data to send response data having the object ID that includes the acquired share information to the request data transfer source.

17. A root node according to claim 1, further comprising:
an object ID notifying module configured to receive an object inquiry from the client, create object specific value that is a specific value for an object specified in the object inquiry and object ID that includes share information denoting a share unit of the object and notifies the object ID to the client,
wherein the request data receiving module is configured to receive request data that includes the notified object ID.

18. A file server system for providing a file service to a client, comprising:
a plurality of root nodes configured to be logically located between a client and a plurality of file servers that includes a file system, each including one or more objects, and carry out file level virtualization for logically providing a plurality of share units' that can be shared among each file system of at least each file server, to the client,
wherein each root node comprises,
a memory configured to store transfer control information associated with share information that denotes each share unit, information of one or more devices that denotes one or more of the plurality of file servers and the other one or more root nodes managing a share unit of the share information, and one or more algorithm information that denotes how to convert an object ID corresponding to any of the file servers of the device information,
a request data receiving module configured to receive request data which includes an object ID including the share information and denoting any of objects of a share unit of the share information,
a request data processing module configured to reference transfer control information upon reception of the request data, and specify any one of the plurality of file servers and the other one or more root nodes, and algorithm for converting the object ID from device information and algorithm information corresponding to the share information in the object ID of the request data,
a converting module configured to convert the object ID included in the request data based on the specified algorithm; and
a request data sending module configured to send the request data to the specified one of the plurality of file servers and the other one or more root nodes,
wherein the request data processing module is configured to, when the plurality of device information and algorithm information corresponding to the share information exists in the transfer control information, select the device information and the algorithm information from the plurality of device information and algorithm information according to a predetermined method to specify any one of the plurality of file servers or the other root nodes and the algorithm for converting the object ID;
wherein the request data sending module is configured to, when the specified algorithm is a predetermined value, send the received request data to the specified one of the plurality of file servers and the other root nodes, and
wherein the request data sending module is configured to, when the specified algorithm is not a predetermined value, send request data in which the converting module converted the object ID to the specified one of the plurality of file servers.

19. A relay method according to a root node,
wherein the root node is configured to be logically located between a client and a plurality of file servers that includes a file system, each including one or more objects, and carry out file level virtualization for logically providing a plurality of share units' that can be shared among each file system of at least each file server, to the client, and relay request data from the client to any one of the plurality of file servers and the other root nodes,
the relay method comprising:
storing transfer control information associated with share information that denotes each share unit, information of one or more devices that denotes one or more of the plurality of file servers and the other one or more root nodes managing a share unit of the share information, and one or more algorithm information that denotes how to convert an object ID corresponding to any of the file servers of the device information;
receiving request data which includes an object ID including the share information and denoting any of objects of a share unit of the share information;
referencing transfer control information upon reception of the request data, and specifying any one of the plurality of file servers and the other one or more root nodes, and algorithm for converting the object ID from device information and algorithm information corresponding to the share information in the object ID of the request data;
when the plurality of device information and algorithm information corresponding to the share information exists in the transfer control information, selecting one of the device information from the plurality of device information based on response time measured in advance and selecting algorithm information corresponding to the selected one of the device information to select one of the device information and the algorithm information from the plurality of device information and the algorithm information and specify any one of the plurality of file servers and the other root nodes and algorithm for converting the object ID;

when the specified algorithm is a predetermined value, sending the received request data to the specified one of the plurality of file servers and the other root nodes;

when the specified algorithm is not a predetermined value, converting the object ID of the request data based on the algorithm, and sending request data including the converted object ID to the specified one of the plurality of file servers.

* * * * *